United States Patent
Al Abed et al.

(10) Patent No.: US 12,497,411 B2
(45) Date of Patent: Dec. 16, 2025

(54) MUSCARINIC ACETYLCHOLINE RECEPTOR SUBTYPE 4 ANTAGONISTS IN THE TREATMENT OF ANEMIA

(71) Applicants: COLD SPRING HARBOR LABORATORY, Cold Spring Harbor, NY (US); THE FEINSTEIN INSTITUTES FOR MEDICAL RESEARCH, Manhasset, NY (US)

(72) Inventors: Yousef Al Abed, Dix Hills, NY (US); Lingbo Zhang, Woodside, NY (US)

(73) Assignees: COLD SPRING HARBOR LABORATORY, Cold Spring Harbor, NY (US); THE FEINSTEIN INSTITUTES FOR MEDICAL RESEARCH, Manhasset, NY (US)

( * ) Notice: Subject to any disclaimer, the term of this patent is extended or adjusted under 35 U.S.C. 154(b) by 956 days.

(21) Appl. No.: 17/442,926

(22) PCT Filed: Mar. 20, 2020

(86) PCT No.: PCT/US2020/023989
§ 371 (c)(1),
(2) Date: Sep. 24, 2021

(87) PCT Pub. No.: WO2020/198054
PCT Pub. Date: Oct. 1, 2020

(65) Prior Publication Data
US 2022/0185821 A1     Jun. 16, 2022

Related U.S. Application Data

(60) Provisional application No. 62/823,214, filed on Mar. 25, 2019.

(51) Int. Cl.
*C07D 498/14*     (2006.01)
*C07D 401/06*     (2006.01)

(52) U.S. Cl.
CPC ......... *C07D 498/14* (2013.01); *C07D 401/06* (2013.01)

(58) Field of Classification Search
CPC ... C07D 209/04; C07D 217/00; C07D 498/14
See application file for complete search history.

(56) References Cited

U.S. PATENT DOCUMENTS

| | | | |
|---|---|---|---|
| 3,649,626 A * | 3/1972 | von Standtmann et al. | C07D 498/14 544/95 |
| 6,500,837 B2 | 12/2002 | Augelli-Szafran et al. | |
| 6,812,228 B2 * | 11/2004 | Augelli-Szafran | A61P 25/08 544/89 |
| 8,329,689 B2 | 12/2012 | Ivashchenko et al. | |
| 2002/0068752 A1 | 6/2002 | Augelli-Szafran et al. | |
| 2011/0160197 A1 | 6/2011 | Ivashchenko et al. | |
| 2013/0059783 A1 | 3/2013 | Flygare et al. | |
| 2022/0185821 A1 | 6/2022 | Al Abed et al. | |

FOREIGN PATENT DOCUMENTS

| | | |
|---|---|---|
| EP | 3946321 A4 | 3/2023 |
| JP | 2002-114786 A | 4/2002 |
| WO | 2011113036 A2 | 9/2011 |
| WO | 2018022668 A2 | 2/2018 |
| WO | 2019/010491 A1 | 1/2019 |
| WO | 2020198054 A1 | 10/2020 |

OTHER PUBLICATIONS

Augelli-Szafran et al., Bioorganic and Medicinal Chemistry Letters vol. 8 pp. 1991-1996. Published 1998 (Year: 1998).*
Augelli-Szafran (Bioorganic and Medicinal Chemistry Letters vol. 8 pp. 1991-1996. Published 1998) (Year: 1998).*
Bohme (J. Med. Chem vol. 45 pp. 3094-3102 published 2002) (Year: 2002).*
Boehme, T.M., et al., "Analogs of M4 selective synthetic muscarinic receptor antagonists: synthesis, binding and pharmacokinetic properties", Medicinal Chemistry Research, Jan. 1, 2002, pp. 423-427, vol. 11, No. 8.
Boehme, T.M., et al., "Synthesis and Pharmacology of Benzoxazines as Highly Selective Antagonists at M4 Muscarinic Receptors", Journal of Medicinal Chemistry, Jan. 1, 2002, pp. 3094-3102, vol. 45, No., 14.
Extended European Search Report dated Feb. 8, 2023 received in European Application No. 20776829.2, 12 pages.
Notice of Reasons for Rejection received in Japanese Patent Application No. 2021-553300 dated Feb. 20, 2024, 9 pages.
Lodish, H., "New drugs for anemia treatment based on a new understanding of the mechanisms of stress erythropoiesis", Whitehead Institute for Biomedical Research, Sep. 2013, 33 pages, Award No. W81XWH-12-1-0449.
Zhang, L., "PPosttranscriptional regulation of erythropoiesis by RNA-binding proteins and microRNAs", Thesis submitted for the degree of Doctor of Philosophy in Computation and Systems Biology (CSB), Singapore-MIT Alliance, National University of Singapore, 2013, 134 pages.
Notification to File Divisional Application received in Chinese Patent Application No. 202080024089.9, Oct. 18, 2023, 7 pages.
International Search Report dated Aug. 27, 2020 issued in PCT/US2020/023989.
Augelli-Szafran, Corinne E. et al., "Identification and Characterization of m4 Selective Muscarinic Antagonists", Bioorganic & Medicinal Chemistry Letters (1998), vol. 8, Issue 15, pp. 1991-1996.
Office Action issued on May 6, 2025 in Canadian Patent Application No. 3,132,381, 3 pages.

* cited by examiner

*Primary Examiner* — George W Kosturko
(74) *Attorney, Agent, or Firm* — Scully, Scott, Murphy & Presser, P.C.

(57) ABSTRACT

This disclosure generally relates to treating anemias. More specifically, the disclosure relates to use of muscarinic acetylcholine receptor subtype 4 antagonists, such as small molecule compounds, to promote self-renewal of burst forming unit erythroid (BFU-E) cells and treat anemias.

24 Claims, 12 Drawing Sheets

MUSCARINIC ACETYLCHOLINE RECEPTOR SUBTYPE 4 ANTAGONISTS IN THE TREATMENT OF ANEMIA

CROSS REFERENCE TO RELATED APPLICATION

The present application claims benefit of U.S. Provisional Application No. 62/823,214, filed on Mar. 25, 2019, all of the contents of which are incorporated herein by reference.

STATEMENT REGARDING FEDERALLY SPONSORED RESEARCH

This invention was made with government support under HL127522 awarded by the National Institutes of Health. The government has certain rights in the invention.

FIELD OF THE DISCLOSURE

This disclosure generally relates to treating diseases and conditions resulting from muscarinic acetylcholine receptor subtype 4 (M4) activity. More specifically, the disclosure relates to use of small molecule M4 antagonist compounds that promote self-renewal of burst forming unit erythroid (BFU-E) cells to treat anemias.

BACKGROUND ART

Stem and progenitor cells of many adult lineages undergo self-renewal, a crucial aspect of tissue homeostasis, maintenance, and regeneration (North T. E. et al., *Nature* 447: 1007-1011 (2007); He S. et al., *Annu Rev Cell Dev Biol* 25:377-406 (2009); Simons B. D. et al., *Cell* 145:851-862 (2011); Seita J. et al., *Wiley Interdiscip Rev Syst Biol Med* 2:640-653 (2010); Xu Y. et al., *Nature* 453:338-344 (2008); Sun J. et al., *Nature* 514:322-347 (2014); Sharpless N. E. et al., *Nat Rev Mol Cell Biol* 8:703-713 (2007); Rossi D. J. et al., *Cell* 132:681-696 (2008)). In the hematopoietic system, the burst-forming unit erythroid (BFU-E) is the first lineage-determined erythroid progenitor, with substantial potential to undergo self-renewal to generate thousands of erythrocytes. BFU-Es undergo differentiation leading to the formation of the late erythroid progenitor, colony-forming unit erythroid (CFU-E), which forms erythrocytes after undergoing limited 3-4 cell divisions (Zhang L. et al., *Genes Dev* 25:119-124 (2011)). While survival and differentiation of CFU-Es is mainly controlled by erythropoietin (EPO), regulation of BFU-E self-renewal and differentiation is less well understood. EPO is mainly used to treat anemias caused by defects in EPO production, as seen in chronic kidney disease. However, many anemic patients do not possess enough BFU-Es and subsequently not enough CFU-Es to respond to EPO treatment (Flygare J. et al., *Blood* 117:3435-3444 (2011); Zhang L. et al., *Nature* 499:92-96 (2013); Sankaran V. G. et al., *Nat Med* 21:221-230 (2015); Bauer et al., *Genes Dev* 13:2996-3002 (1999); Komrokji R. S. et al., *Curr Hematol Malig Rep* 6:145-153 (2011); Kotla V. et al., *J Hematol Onco.* 2:36 (2009)). To treat these EPO-resistant anemias, a better understanding of the molecular mechanisms underlying BFU-E self-renewal is needed. Previous reports indicate that the compound PD102807 selectively inhibits CHRM4 over other members of the muscarinic acetylcholine receptor family (C. H. Croy et al., Characterization of PCS1055, a novel muscarinic M4 receptor antagonist. *Eur. J. Pharmacol* 782, 70-76, 2016; T. M. Böhme et al., Synthesis and pharmacology of benzoxazines as highly selective antagonists at M(4) muscarinic receptors. *J Med. Chem* 45, 3094-3102, 2002).

SUMMARY OF THE DISCLOSURE

In one aspect, the present disclosure is directed to compounds that function as muscarinic acetylcholine receptor subtype 4 (M4) antagonists. The M4 antagonist compounds are preferably selective (i.e., specific), at least to some extent, to M4 compared to other muscarinic acetylcholine receptor subtypes (e.g., M1, M2, M3, and/or M5). The efficacy of the M4-specific antagonist is believed to arise by virtue of its ability to bind to the orthosteric pocket of M4. The M4 antagonist compounds are also preferably reduced in blood brain barrier penetration compared to other M4 antagonist compounds of the art, such as PD102807.

In a first set of embodiments, the M4 antagonist compound has the following structure:

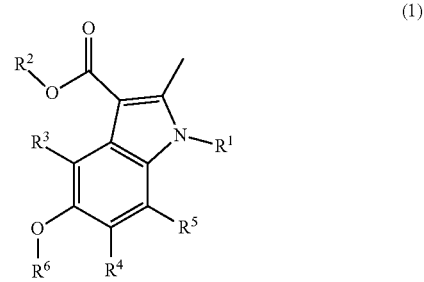

(1)

wherein: $R^1$ is H or $CH_3$; $R^2$ is a hydrocarbon group having 1-3 carbon atoms; $R^3$, $R^4$, and $R^5$ are independently selected from hydrogen atom, halogen atoms, $CH_3$, $CF_3$, OH, $OCH_3$, SH, $SCH_3$, and the following structure (1-1):

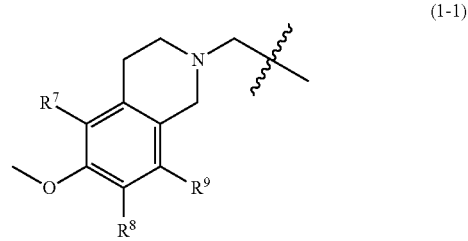

(1-1)

provided that one or two of $R^3$, $R^4$, and $R^5$ is the structure of Formula (1-1); $R^6$ is H or $CH_3$; $R^7$, $R^8$, and $R^9$ are independently selected from hydrogen atom, halogen atoms, $CH_3$, $CF_3$, OH, $OCH_3$, SH, and $SCH_3$; and wherein the compound of Formula (1) includes pharmaceutically acceptable salts, solvates, enantiomers, and polymorphs of the compound of Formula (1).

In particular embodiments, the compound of Formula (1) has the following structure:

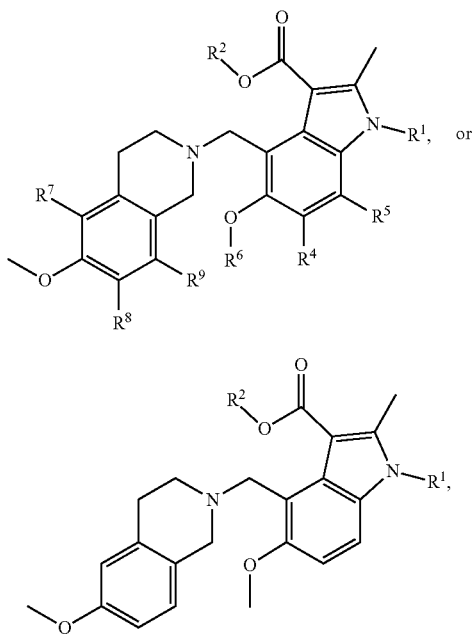

(1a)

(1b)

wherein the R groups in formulas shown above are as defined above or below, including any of the specific selections provided.

The compound of Formula (1) may also be a methylated salt having the following structure:

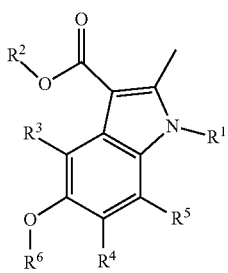

(1c)

wherein: $R^1$ is H or $CH_3$; $R^2$ is a hydrocarbon group having 1-3 carbon atoms; $R^3$, $R^4$, and $R^5$ are independently selected from hydrogen atom, halogen atoms, $CH_3$, $CF_3$, OH, $OCH_3$, SH, $SCH_3$, and the following structure (1-2):

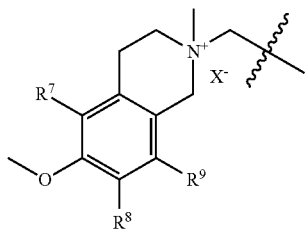

(1-2)

provided that one or two of $R^3$, $R^4$, and $R^5$ is the structure of Formula (1-2); $R^6$ is H or $CH_3$; $R^7$, $R^8$, and $R^9$ are independently selected from hydrogen atom, halogen atoms, $CH_3$, $CF_3$, OH, $OCH_3$, SH, and $SCH_3$; $X^-$ is an anion to counterbalance the positively charged portion of the compound; and wherein the compound of Formula (1c) includes pharmaceutically acceptable salts, solvates, enantiomers, and polymorphs of the compound of Formula (1c).

In particular embodiments, the methylated salt compound of Formula (1c) has either of the following structures:

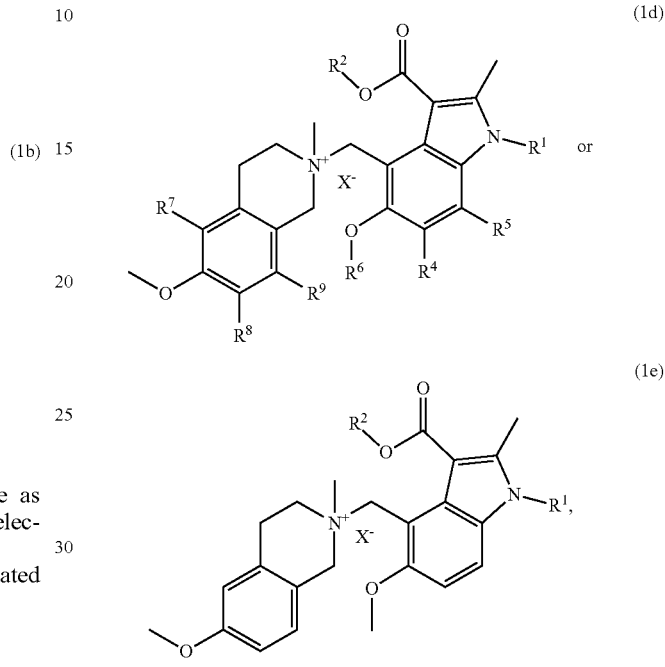

(1d)

(1e)

wherein the R groups and $X^-$ in formulas shown above are as defined above or below, including any of the specific selections provided.

In a second set of embodiments, the M4 antagonist compound has the following structure:

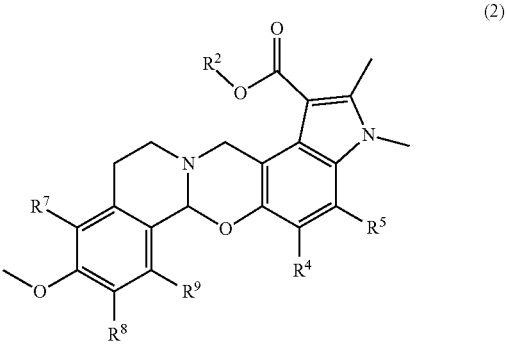

(2)

wherein: $R^2$ is a hydrocarbon group having 1-3 carbon atoms; and $R^4$, $R^5$, $R^7$, $R^8$, and $R^9$ are independently selected from hydrogen atom, halogen atoms, $CH_3$, $CF_3$, OH, $OCH_3$, SH, and $SCH_3$; and wherein the compound of Formula (2) includes pharmaceutically acceptable salts, solvates, enantiomers, and polymorphs of the compound of Formula (2).

In particular embodiments, the compound of Formula (2) has the following structure:

(2a)

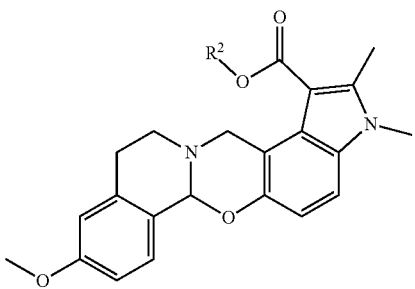

wherein $R^2$ is as defined above or below, including any of the specific selections provided.

In a third set of embodiments, the M4 antagonist compound has the following structure:

(2b)

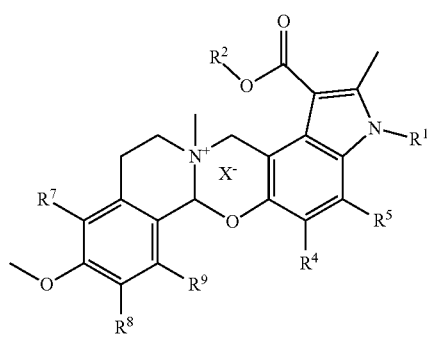

wherein: $R^1$ is H or $CH_3$; $R^2$ is a hydrocarbon group having 1-3 carbon atoms; $R^4$, $R^5$, $R^7$, $R^8$, and $R^9$ are independently selected from hydrogen atom, halogen atoms, $CH_3$, $CF_3$, OH, $OCH_3$, SH, and $SCH_3$; and wherein the compound of Formula (2b) includes pharmaceutically acceptable salts, solvates, enantiomers, and polymorphs of the compound of Formula (2b).

In particular embodiments, the compound of Formula (2b) has the following structure:

(2c)

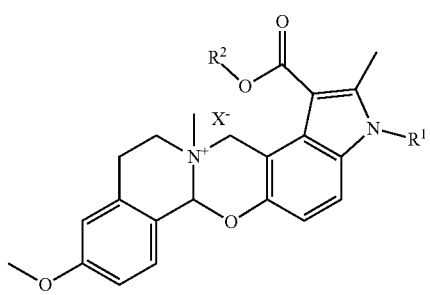

wherein $R^1$, $R^2$, and $X^-$ are as defined above or below, including any of the specific selections provided.

In another aspect, the present disclosure is directed to treating a disease or condition resulting from muscarinic acetylcholine receptor subtype 4 (M4) activity in a subject, the method comprising administering a pharmaceutically effective amount of an M4-specific antagonist to the subject, wherein the M4-specific antagonist is any one of the M4-specific antagonist compounds described above. In particular embodiments, the disease or condition being treated is anemia. In some embodiments, the anemia is associated with hemolysis, myelodysplastic syndromes (MDS), aging, surgery, chemotherapy, or radiation therapy. In some embodiments, the M4 antagonist is administered to the subject orally. Other aspects of this disclosure are directed to pharmaceutical compositions containing one or more of any of the M4-specific antagonists described above, as well as the use of any one or more of these M4-specific antagonists in the preparation of a medicament for treating a disease or condition resulting from M4 activity, such as anemia, in a subject.

In another aspect, the present disclosure is directed to a method for promoting self renewal of burst forming unit erythroid (BFU-E) cells, wherein the method includes contacting the BFU-E cells with a M4-specific antagonist. The BFU-E cells may be, for example, within a living (e.g., human) subject when contacted with the M4-specific antagonist, or the BFU-E cells may be taken from a subject and contacted with the M4-specific antagonist ex vivo. The M4-specific antagonist can include any of the M4-specific antagonists described herein. In particular embodiments, the increased self-renewal of the BFU-E cells is used to treat anemia in a subject.

BRIEF DESCRIPTION OF THE DRAWINGS

FIG. 2A: The expression levels of muscarinic acetylcholine receptor family members, including Chrm1, Chrm2, Chrm3, Chrm4, and Chrm5, at the BFU-E, CFU-E, and erythroblast stages were measured using RNA-Seq. The RPKM values are shown. FIG. 2B: BFU-Es were infected with either control virus or virus encoding shRNA targeting Chrm4. The numbers of GFP+ cells in the culture system were counted from day 0 to day 9. The average and standard deviation (STDEV) of 3 repeats are shown; there was a significantly higher fold cell expansion in GFP+ Chrm4 viral shRNAs infected cells than GFP+ control viral shRNA infected cells. FIG. 2C: The expression levels of Chrm4 in BFU-Es infected with either control virus or virus encoding shRNA targeting Chrm4 were measured on day 3 of culture using western blot. The average and standard deviation (STDEV) of 3 repeats are shown; the expression of Chrm4 is significantly reduced following treatment with shRNA targeting for Chrm4. FIG. 2D: BFU-Es were infected with either control virus or virus encoding shRNA targeting Chrm4. GFP+ cells were sorted for BFU-E colony formation assay. The average and STDEV of 4 repeats are shown; there was a significantly higher fold BFU-E colony formation in GFP+ Chrm4 viral shRNAs infected cells than GFP+ control viral shRNA infected cells. "*" represents p<0.05 of t-test; "" represents p<0.01, "*" represents p<0.001 of t-test.

FIG. 3A: Mouse BFU-Es were cultured in the absence or presence of 100 µM of forskolin. Total numbers of cells in the culture system were counted on day 10. The average and STDEV of fold cell expansion of 3 repeats are shown; there was a significantly higher fold cell expansion in cultures treated with cAMP activator forskolin than untreated. FIG. 3B: Mouse BFU-Es were cultured with indicated compounds (3 nM PD102807 and 5 µM KT5720). Total numbers of cells in the culture system were counted on day 9. The average and STDEV of fold cell expansion of 3 repeats are shown; there was a significantly reduced fold cell expansion in cultures treated with PKA inhibitor KT5720 than untreated. FIG. 3C: The x-axis represents the ratio of each gene's expression in CFU-Es relative to BFU-Es, calculated as a log 2 ratio. The y-axis represents the cumulative fraction and is plotted as a function of the relative expression (x axis). "CREB targets" represent direct target genes of CREB in BFU-E identified by ChIP-Seq. "ZFP36L2 targets" represent direct target genes of ZFP36L2 in BFU-E identified by RIP-ChIP as reported previously (Zhang L. et al., *Nature* 499:92-96 (2013)). "All genes" represent all the genes expressed in BFU-E as reported previously (Zhang L. et al., supra). P-value was calculated using the Kolmogorov-Smirnov test. FIG. 3D: Mouse BFU-Es were cultured in the absence or presences of 100 µM of oxyphenonium bromide, and RNA-Seq was performed on day 3 cultured cells. CREB ChIP-Seq was performed on BFU-Es after culturing with 100 µM oxyphenonium bromide for 45 min. RNA-Seq results and CREB ChIP-Seq results were combined for BETA analysis (Wang S. et al., *Nat Protoc* 8:2502-2515 (2013)). "*" represents p<0.05 and "**" represents p<0.01 of t-test.

FIG. 4A: Chemical structure of PD102807. FIG. 4B: Mouse BFU-Es were cultured with or without 3 nM PD102807, and cell numbers in the culture system were counted. The average and standard deviation (STDEV) of 9 repeats are shown; there was a significantly higher fold expansion of BFU-Es in cultures treated with OB than untreated. "*" represents p<0.001. FIG. 4C: Mice were treated once per day through oral delivery with DMSO or 100 mg/kg PD102807. Mice were injected with PHZ to induce hemolytic anemia. CBC was performed on day 6. The average and STDEV of HCT are shown; PHZ-induced anemia was significantly improved in mice treated with PD102807 than DMSO control. FIG. 4D: The average and STDEV of RBC are shown; PHZ-induced anemia was significantly improved in mice treated with PD102807 than with DMSO control. "" represents p<0.01. FIG. 4E: PD102807 at concentrations of $1 \times 10^{-9}$ M, $1 \times 10^{-8}$ M, $1 \times 10^{-7}$ M, $1 \times 10^{-6}$ M, and $1 \times 10^{-5}$ M were tested in standard binding assays with radioligands and cell membranes with receptors. Compound binding was calculated as a percent inhibition of the binding of a radioactively labeled ligand specific for each target, and the Ki values were determined. PD102807 has the indicated selectivity/specificity for M4 vs M1, M2, M3 or M5 receptors.

FIG. 7 shows the results for Compounds A, B, C, H, and I, while FIG. 8 shows the results for Compounds D, E, F, G, J, and K. The results of the mouse primary cell BFU-E culture assay show that Compounds A-K are roughly as potent as PD in stimulating BFU-E expansion; all compounds were effective in the low nanomolar range, with compounds B and F slightly less potent than the others.

DETAILED DESCRIPTION

Figures 1A, 1B, 1C, 1D, 1E:
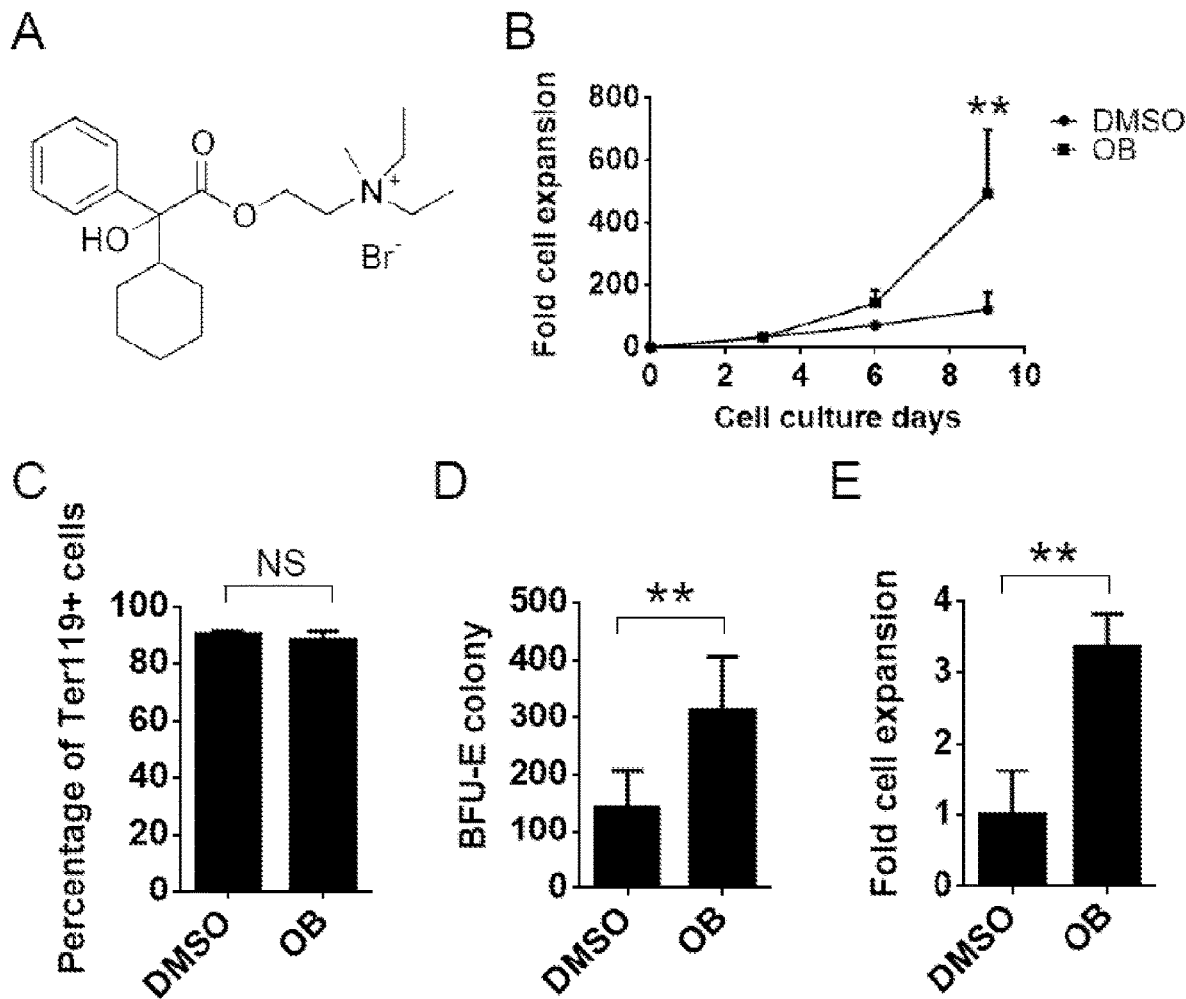
FIGS. 1A-1E. Muscarinic acetylcholine receptor antagonist increases erythrocyte production by regulating BFU-E self-renewal. 1A, Schematic diagram showing chemical structure of oxyphenonium bromide (OB). 1B, Mouse BFU-Es were cultured with or without 100 µM oxyphenonium bromide, and cell numbers in the culture system were counted; there was a significantly higher fold cell expansion in cultures treated with OB than untreated. The average and standard deviation (STDEV) of 3 repeats are shown. 1C, Day 14 cultured cells were stained with anti-Ter119 antibody and analyzed with flow cytometry. The average and STDEV of the percentage of Ter19+ cells of 3 repeats are shown; there is no difference in the percentage of Ter119+ cells in cultures treated with OB or untreated. 1D, Day 6 cultured cells were plated on methylcellulose medium. BFU-E colonies were counted 9 days after plating. The average and STDEV of 3 repeats are shown; significantly more BFU-E colonies arose from cultures treated with OB than untreated. 1E, Human CD34+ cells were cultured with or without oxyphenonium bromide (200 µM), and cell numbers in the culture system were counted. The average and STDEV of 3 repeats are shown; there was a significantly higher fold expansion in cultures treated with OB than untreated. "NS" represents statistically no difference; "*" represents p<0.05 of t-test; "**" represents p<0.01 of t-test.

It has herein been discovered in accordance with the present invention that the muscarinic acetylcholine receptor CHRM4 pathway is a crucial regulator of BFU-E self-renewal. It has been demonstrated herein that muscarinic acetylcholine receptor subtype 4 antagonists promote BFU-E self-renewal and expansion, and correct anemias in hemolysis, MDS, and aging mouse models. Use of M4-specific antagonists in therapeutic methods for the treatment of anemias is therefore provided herein.

Muscarinic Acetylcholine Receptors

Muscarinic acetylcholine receptors are members of the G-protein coupled receptor family, i.e., these receptors form G protein-receptor complexes in the cell membranes upon binding of the ligand (acetylcholine), which triggers downstream signal transduction. Five subtypes of muscarinic receptors have been identified, named M1 to M5 (see, e.g., Felder et al., *FASEB J.: Off Publ. Fed. Am. Soc. Exp. Biol.* 9, 619-625 (1995)). The M1, M3 and M5 receptors are primarily coupled to Gq/G11-type G proteins, and the formation of a G-protein-receptor complex results in the formation of diacylglycerol, which activates protein kinase C and increases the release of inositol triphosphate (IP3), leading to the release of free intracellular Ca2+. The M2 and M4 receptors are primarily coupled to Gi/Go-type G proteins and play inhibitory roles in cAMP production (Felder et al. (1995), supra).

Muscarinic acetylcholine receptors include seven transmembrane domains, connected by alternating intracellular and extracellular loops. Although the M1-M5 receptor subtypes display a high degree of sequence identity among one another, studies have revealed structural differences in the orthosteric pocket shape (Bonner et al., *Science* 237: 527-532 (1987)); Caulfield et al., *Pharmacol. Rev.* 50: 279-290 (1998); and Hulme et al., *Annu. Rev. Pharmacol. Toxicol.*

30: 633-673 (1990)), as well as pharmacological differences in binding of agonists or antagonist (Bohme et al., *J. Med. Chem.* 45: 3094-3102 (2002); and Croy et al., *Europ. J. Pharmacol* 782: 70-76 (2016)). Consistent with these structural and pharmacological differences, subtype specific antagonists have been developed and documented.

M4-Specific Antagonists

The term "antagonist" of a muscarinic acetylcholine receptor, as used herein, refers to compounds that can bind to the muscarinic acetylcholine receptor but does not trigger the downstream signal transduction (e.g., G protein coupling and/or activation). Therefore, an antagonist of a muscarinic acetylcholine receptor competes with the native ligand, acetylcholine, in binding to the receptor, thereby interfering with, blocking or otherwise preventing the binding of acetylcholine to the receptor, and inhibits the biological activity of the muscarinic acetylcholine receptor. In some embodiments, inhibition of the biological activity of a muscarinic acetylcholine receptor is reflected by an inhibition of G protein activation. G protein activation can be measured by the amount of non-hydrolyzable GTP-γ-[$^{35}$S] bound to the Ga subunit, as described by, e.g., Croy et al., *Eur. J. Pharmacol.* 782: 70-76 (2016).

The term "M4-specific" antagonist refers to an antagonist that displays a preference for binding to M4 over the other muscarinic acetylcholine receptor subtypes, i.e., over M1-M3 and M5. In some embodiments, the preference in binding to M4 is reflected by a higher affinity for M4 than for the other receptor subtypes. In particular embodiments, an M4-specific antagonist has an affinity for M4 that is at least 50%, 60%, 70%, 80%, 90%, or 100% greater than its affinity to one or more of the other receptor subtypes (e.g., M1, M2, M3, and/or M5), wherein "100% greater" is equivalent to 1 fold greater than, or 2 fold of, the affinity being compared to. In some embodiments, an M4-specific antagonist has an affinity for M4 that is at least 2, 3, 4, 5, 10, 20, 30, 40, 50, 60, 70, 80, 90, or 100 fold, or greater, than its affinity to one or more of the other receptor subtypes.

The term "selectivity" as used herein refers to a greater affinity of an antagonist for one receptor subtype over another receptor subtype. Selectivity can be determined based on the ratio of the binding affinities of the receptors being compared. For example, selectivity of an antagonist between M4 and M2 is measured by the ratio of the binding affinity for M4 relative to the binding affinity for M2. As another example, selectivity of an antagonist between M4 and M3 is measured by the ratio of the binding affinity for M4 relative to the binding affinity for M3. As Ki inversely correlates with binding affinity, selectivity can also be determined based on the ratio of Ki for M2 or M3 over Ki for M4, wherein a ratio greater than 1 is indicative of a preference for M4 over M2 or M3. In particular embodiments, the selectivity of an M4-specific antagonist is at least 10, 20, 30, 40, 50, 60, 70, 80, 90, 100 fold, over one or more of the other receptor subtypes.

Methods for measuring the binding affinity of compounds for muscarinic acetylcholine receptors have been documented in the art; e.g., by [3H]NMS binding using membranes from transfected CHO cells. See Bohme et al. (*J. Med. Chem* 2002, 45: 3094-3192), Dorje et al. (*J. Pharmacol. Exp. Ther.* 1991, 256: 727-733), and Buckley et al. (*Mol. Pharmacol.* 1989, 35: 469-476). The Ki value (i.e., the equilibrium dissociation constant) of a test compound is derived from IC50 values using the Cheng-Prusoff equation, Ki=IC50/(1+L/Kd). The lower the Ki value, the higher the affinity. In contrast, pKi is the negative logarithm of Ki, and thus the higher the pKi value, the higher the affinity.

In some embodiments, an M4-specific antagonist has a pKi value of 6.0, 6.25, 6.5, 6.75, 7.0, 7.25, 7.5, 7.75, 8.0, 8.25, 8.5, 8.75, 9.0, or greater, for binding to M4. In some embodiments, an M4-specific antagonist has a pKi value of 6.0, 6.25, 6.5, 6.75, 7.0, 7.25, 7.5, 7.75, 8.0, 8.25, 8.5, 8.75, 9.0, or greater, and a selectivity of at least 30, 40, 50, 60, 70, 80, 90, 100 fold, for M4 over one or more of the other receptor subtypes.

In one set of embodiments, the M4 antagonist compound has the following structure:

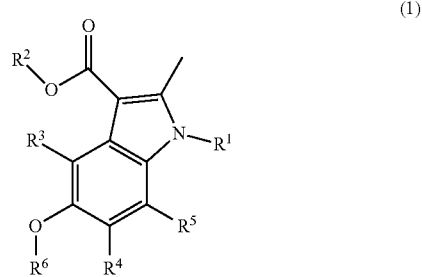

(1)

In Formula (1) above, the variables $R^1$ and $R^6$ are independently selected from hydrogen atom (H) and methyl ($CH_3$) (i.e., each is either H or $CH_3$), the variable $R^2$ is a hydrocarbon group having 1-3 carbon atoms (e.g., methyl, ethyl, n-propyl, isopropyl, cyclopropyl, vinyl, or propen-2-yl); the variables $R^3$, $R^4$, and $R^5$ are independently selected from hydrogen atom, halogen atoms (i.e., F, Cl, Br, or I), $CH_3$, $CF_3$, OH, $OCH_3$, SH, $SCH_3$, and the following structure (1-1):

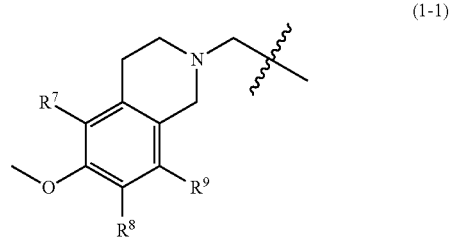

(1-1)

provided that one or two of $R^3$, $R^4$, and $R^5$ is the structure of Formula (1-1). In some embodiments, one of $R^3$, $R^4$, and $R^5$ is the structure of Formula (1-1). In other embodiments, two of $R^3$, $R^4$, and $R^5$ (e.g., $R^3$ and $R^4$; or $R^3$ and $R^5$; or $R^4$ and $R^5$) are the structure of Formula (1-1). The variables $R^7$, $R^8$, and $R^9$ in Formula (1-1) are independently selected from hydrogen atom, halogen atoms, $CH_3$, $CF_3$, OH, $OCH_3$, SH, and $SCH_3$. When two of $R^3$, $R^4$, and $R^5$ are the structure of Formula (1-1), $R^7$, $R^8$, and $R^9$ in Formula (1-1) may be the same or different (i.e., independently selected) between the two instances of Formula (1-1). Formula (1) also includes pharmaceutically acceptable salts, solvates, enantiomers, and polymorphs of compounds of Formula (1).

In a first set of embodiments of Formula (1), $R^1$ is H and $R^2$ is methyl, ethyl, n-propyl, or isopropyl; or $R^1$ is H and $R^2$ is methyl or ethyl; or $R^1$ is H and $R^2$ is ethyl. In a second set of embodiments of Formula (1), $R^1$ is methyl and $R^2$ is methyl, ethyl, n-propyl, or isopropyl; or R is methyl and $R^2$ is methyl or ethyl; or $R^1$ is methyl and $R^2$ is ethyl. In a third set of embodiments of Formula (1), at least or only $R^3$ is the Formula (1-1) and $R^4$ and/or $R^5$ are independently selected from hydrogen atom, halogen atoms, $CH_3$, $CF_3$, OH, $OCH_3$, SH, and $SCH_3$; or $R^3$ is the Formula (1-1) and $R^4$ and/or $R^5$ are independently selected from hydrogen atom, halogen atoms, $CH_3$, and $CF_3$; or $R^3$ is the Formula (1-1) and one or both of $R^4$ and $R^5$ are hydrogen atoms. In a fourth set of embodiments of Formula (1), at least or only $R^4$ is the Formula (1-1) and $R^3$ and/or $R^5$ are independently selected from hydrogen atom, halogen atoms, $CH_3$, $CF_3$, OH, $OCH_3$, SH, and $SCH_3$; or $R^4$ is the Formula (1-1) and $R^3$ and/or $R^5$ are independently selected from hydrogen atom, halogen atoms, $CH_3$, and $CF_3$; or $R^4$ is the Formula (1-1) and one or both of $R^3$ and $R^5$ are hydrogen atoms. In a fifth set of embodiments of Formula (1), at least or only $R^5$ is the Formula (1-1) and $R^3$ and/or $R^4$ are independently selected from hydrogen atom, halogen atoms, $CH_3$, $CF_3$, OH, $OCH_3$, SH, and $SCH_3$; or $R^5$ is the Formula (1-1) and $R^3$ and/or $R^4$ are independently selected from hydrogen atom, halogen atoms, $CH_3$, and $CF_3$; or $R^5$ is the Formula (1-1) and one or both of $R^3$ and $R^4$ are hydrogen atoms. In some embodiments, any of the first or second embodiments provided above are combined with any of the third, fourth, or fifth embodiments provided above. In any of the foregoing combinations of embodiments, $R^6$ may be selected as either H or $CH_3$. In any of the foregoing combinations of embodiments, $R^7$, $R^8$, and $R^9$ in Formula (1-1) are independently selected from hydrogen atom, halogen atoms, $CH_3$, $CF_3$, OH, $OCH_3$, SH, and $SCH_3$; or $R^7$, $R^8$, and $R^9$ in Formula (1-1) are independently selected from hydrogen atom, halogen atoms, $CH_3$, and $CF_3$; or one, two, or all of $R^7$, $R^8$, and $R^9$ in Formula (1-1) are hydrogen atoms.

In particular embodiments, the compound of Formula (1) has the following structure in which at least $R^3$ is selected as the structure of Formula (1-1):

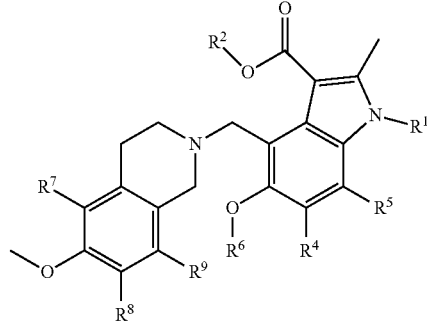

(1a)

In Formula (1a) above, any of the first, second, and third embodiments, and combinations thereof with each other and with particular selections of $R^6$, $R^7$, $R^8$, and $R^9$, as described above under Formula (1), are possible.

In particular embodiments, the compound of Formula (1a) has the following structure:

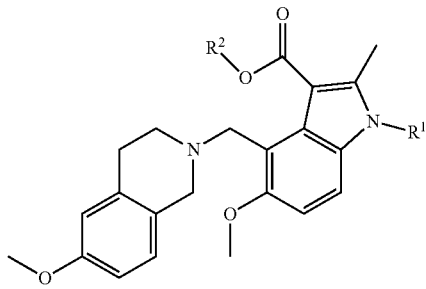

(1b)

In Formula (1b) above, any of the first and second embodiments, as described above for $R^1$ and $R^2$ under Formula (1), are possible.

In some embodiments, the compound of Formula (1) is a methylated salt having the following structure:

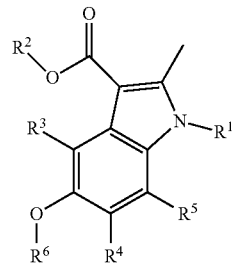

(1c)

wherein: $R^1$ is H or $CH_3$; $R^2$ is a hydrocarbon group having 1-3 carbon atoms; $R^3$, $R^4$, and $R^5$ are independently selected from hydrogen atom, halogen atoms, $CH_3$, $CF_3$, OH, $OCH_3$, SH, $SCH_3$, and the following structure (1-2):

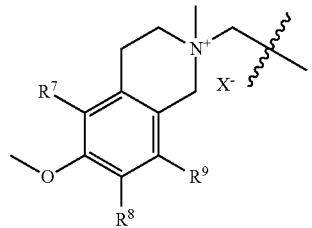

(1-2)

provided that one or two of $R^3$, $R^4$, and $R^5$ is the structure of Formula (1-2); $R^6$ is H or $CH_3$; $R^7$, $R^8$, and $R^9$ are independently selected from hydrogen atom, halogen atoms, $CH_3$, $CF_3$, OH, $OCH_3$, SH, and $SCH_3$. When two of $R^3$, $R^4$, and $R^5$ are the structure of Formula (1-2), $R^7$, $R^8$, and $R^9$ in Formula (1-2) may be the same or different (i.e., independently selected) between the two instances of Formula (1-1). The variable $X^-$ is an anion to counterbalance the positively charged portion of the compound. Formula (1c) also includes pharmaceutically acceptable salts, solvates, enantiomers, and polymorphs of compounds of Formula (1c).

In a first set of embodiments of Formula (1c), $R^1$ is H and $R^2$ is methyl, ethyl, n-propyl, or isopropyl; or $R^1$ is H and $R^2$ is methyl or ethyl; or $R^1$ is H and $R^2$ is ethyl. In a second set of embodiments of Formula (1c), $R^1$ is methyl and $R^2$ is methyl, ethyl, n-propyl, or isopropyl; or R is methyl and $R^2$ is methyl or ethyl; or $R^1$ is methyl and $R^2$ is ethyl. In a third set of embodiments of Formula (1c), at least or only $R^3$ is the Formula (1-2) and $R^4$ and/or $R^5$ are independently selected from hydrogen atom, halogen atoms, $CH_3$, $CF_3$, OH, $OCH_3$, SH, and $SCH_3$; or $R^3$ is the Formula (1-2) and $R^4$ and/or $R^5$ are independently selected from hydrogen atom, halogen atoms, $CH_3$, and $CF_3$; or $R^3$ is the Formula (1-2) and one or both of $R^4$ and $R^5$ are hydrogen atoms. In a fourth set of embodiments of Formula (1c), at least or only $R^4$ is the Formula (1-2) and $R^3$ and/or $R^5$ are independently selected from hydrogen atom, halogen atoms, $CH_3$, $CF_3$, OH, $OCH_3$, SH, and $SCH_3$; or $R^4$ is the Formula (1-2) and $R^3$ and/or $R^5$ are independently selected from hydrogen atom, halogen atoms, $CH_3$, and $CF_3$; or $R^4$ is the Formula (1-2) and one or both of $R^3$ and $R^5$ are hydrogen atoms. In a fifth set of embodiments of Formula (1c), at least or only $R^5$ is the Formula (1-2) and $R^3$ and/or $R^4$ are independently selected from hydrogen atom, halogen atoms, $CH_3$, $CF_3$, OH, $OCH_3$, SH, and $SCH_3$; or $R^5$ is the Formula (1-2) and $R^3$ and/or $R^4$ are independently selected from hydrogen atom, halogen atoms, $CH_3$, and $CF_3$; or $R^5$ is the Formula (1-2) and one or both of $R^3$ and $R^4$ are hydrogen atoms. In some embodiments, any of the first or second embodiments provided above are combined with any of the third, fourth, or fifth embodiments provided above. In any of the foregoing combinations of embodiments, $R^6$ may be selected as either H or $CH_3$. In any of the foregoing combinations of embodiments, $R^7$, $R^8$, and $R^9$ in Formula (1-2) are independently selected from hydrogen atom, halogen atoms, $CH_3$, $CF_3$, OH, $OCH_3$, SH, and $SCH_3$; or $R^7$, $R^8$, and $R^9$ in Formula (1-2) are independently selected from hydrogen atom, halogen atoms, $CH_3$, and $CF_3$; or one, two, or all of $R^7$, $R^8$, and $R^9$ in Formula (1-2) are hydrogen atoms.

In particular embodiments, the methylated salt compound of Formula (1c) has the following structure:

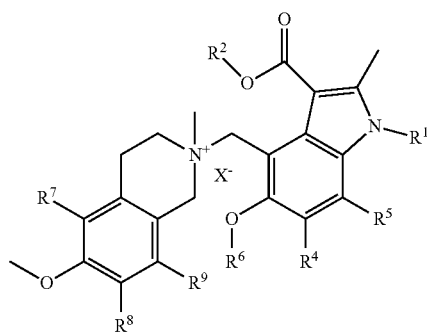

(1d)

In Formula (1d) above, any of the first, second, and third embodiments, and combinations thereof with each other and with particular selections of $R^6$, $R^7$, $R^8$, and $R^9$, as described above under Formula (1c), are possible.

In particular embodiments, the compound of Formula (1c) has the following structure:

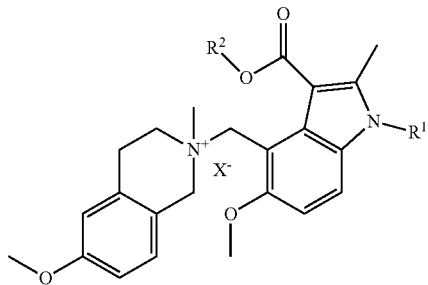

(1e)

In Formula (1e) above, any of the first and second embodiments, as described above for $R^1$ and $R^2$ under Formula (1c), are possible.

In other embodiments, the compound of Formula (1) has the following structure in which at least $R^4$ is selected as the structure of Formula (1-1):

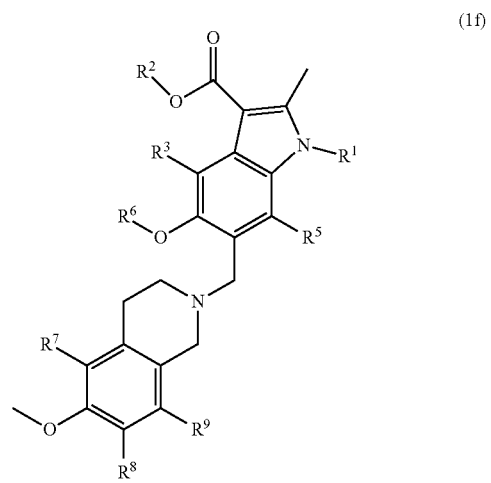

(1f)

In Formula (1f) above, any of the first, second, and fourth embodiments, and combinations thereof with each other and with particular selections of $R^6$, $R^7$, $R^8$, and $R^9$, as described above under Formula (1), are possible.

In particular embodiments, the compound of Formula (1f) has the following structure:

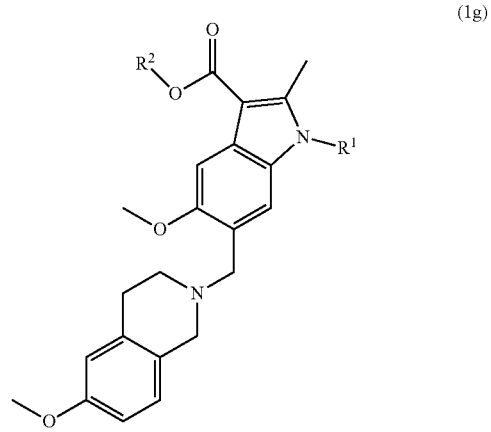

(1g)

In Formula (1g) above, any of the first and second embodiments, as described above for $R^1$ and $R^2$ under Formula (1), are possible.

In other embodiments, the compound of Formula (1) has the following methylated salt structure in which at least $R^4$ is selected as the structure of Formula (1-1):

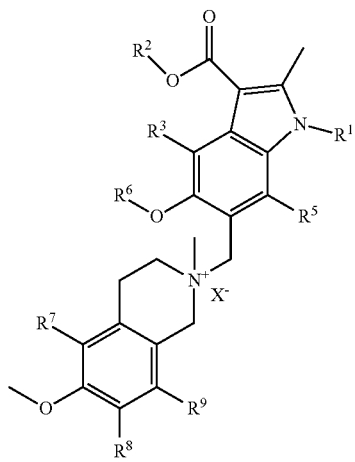
(1h)

In Formula (1h) above, any of the first, second, and fourth embodiments, and combinations thereof with each other and with particular selections of $R^6$, $R^7$, $R^8$, and $R^9$, as described above under Formula (1), are possible.

In particular embodiments, the compound of Formula (1h) has the following structure:

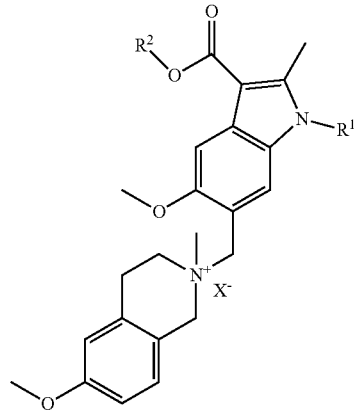
(1i)

In Formula (1i) above, any of the first and second embodiments, as described above for $R^1$ and $R^2$ under Formula (1c), are possible.

In other embodiments, the compound of Formula (1) has the following structure in which at least $R^5$ is selected as the structure of Formula (1-1):

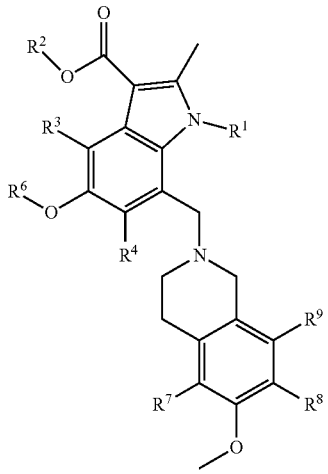
(1j)

In Formula (1j) above, any of the first, second, and fifth embodiments, and combinations thereof with each other and with particular selections of $R^6$, $R^7$, $R^8$, and $R^9$, as described above under Formula (1), are possible.

In particular embodiments, the compound of Formula (1j) has the following structure:

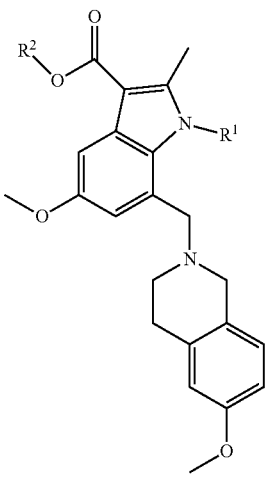
(1k)

In Formula (1k) above, any of the first and second embodiments, as described above for $R^1$ and $R^2$ under Formula (1), are possible.

In other embodiments, the compound of Formula (1) has the following methylated salt structure in which at least $R^5$ is selected as the structure of Formula (1-1):

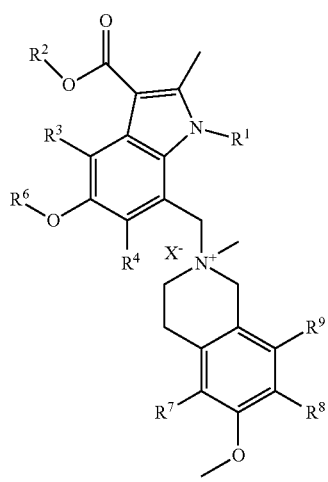

(1m)

In Formula (1m) above, any of the first, second, and fifth embodiments, and combinations thereof with each other and with particular selections of $R^6$, $R^7$, $R^8$, and $R^9$, as described above under Formula (1), are possible.

In particular embodiments, the compound of Formula (1m) has the following structure:

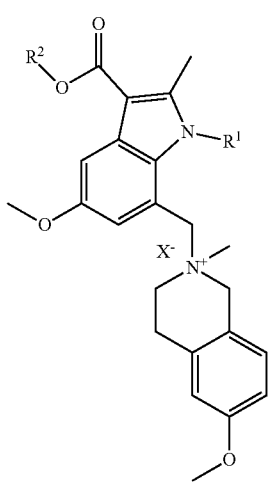

(1n)

In Formula (1n) above, any of the first and second embodiments, as described above for $R^1$ and $R^2$ under Formula (1c), are possible.

In another set of embodiments, the M4 antagonist compound has the following structure:

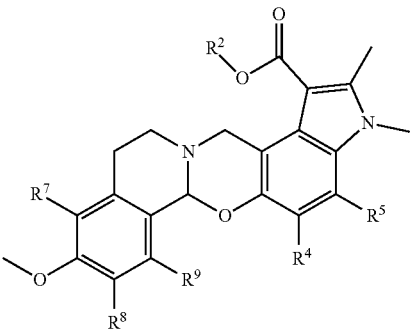

(2)

In Formula (2) above, $R^2$, $R^4$, $R^5$, $R^7$, $R^8$, and $R^9$ are as defined under Formula (1) above. Formula (2) also includes pharmaceutically acceptable salts, solvates, enantiomers, and polymorphs of compounds of Formula (2). In a first set of embodiments of Formula (2), $R^2$ is methyl, ethyl, n-propyl, or isopropyl; or $R^2$ is methyl or ethyl; or $R^2$ is ethyl. In a second set of embodiments of Formula (2), $R^4$ and $R^5$ are independently selected from hydrogen atom, halogen atoms, $CH_3$, $CF_3$, OH, $OCH_3$, SH, and $SCH_3$; or $R^4$ and $R^5$ are independently selected from hydrogen atom, halogen atoms, $CH_3$, and $CF_3$; or one or both of $R^4$ and $R^5$ are hydrogen atoms. In some embodiments, any of the first or second embodiments provided above are combined. In any of the foregoing combinations of embodiments, $R^7$, $R^8$, and $R^9$ are independently selected from hydrogen atom, halogen atoms, $CH_3$, $CF_3$, OH, $OCH_3$, SH, and $SCH_3$; or $R^7$, $R^8$, and $R^9$ are independently selected from hydrogen atom, halogen atoms, $CH_3$, and $CF_3$; or one, two, or all of $R^7$, $R^8$, and $R^9$ are hydrogen atoms.

In particular embodiments, the compound of Formula (2) has the following structure:

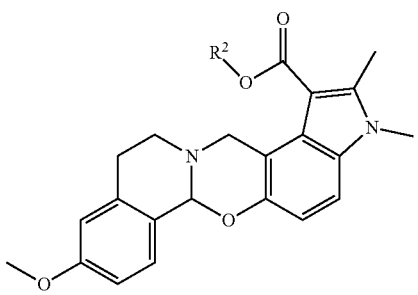

(2a)

In particular embodiments of Formula (2a) above, $R^2$ is methyl, ethyl, n-propyl, or isopropyl; or $R^2$ is methyl or ethyl; or $R^2$ is ethyl.

In another set of embodiments, the M4 antagonist compound has the following structure:

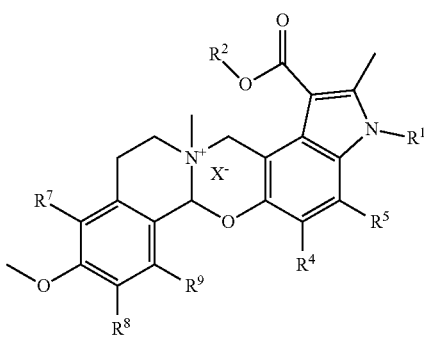

(2b)

In Formula (2b) above, $R^1$, $R^2$, $R^4$, $R^5$, $R^7$, $R^8$, and $R^9$ are as defined under Formula (1) above. Formula (2b) also includes pharmaceutically acceptable salts, solvates, enantiomers, and polymorphs of compounds of Formula (2b). In some embodiments, Formula (2b) represents a racemic mixture; in other embodiments, Formula (2b) represents a single enantiomer, which may be designated as R or S, or the (+) or (−) optical form. The variable $X^-$ is an anion to counterbalance the positively charged portion of the compound.

In a first set of embodiments of Formula (2b), $R^1$ is H and $R^2$ is methyl, ethyl, n-propyl, or isopropyl; or $R^1$ is H and $R^2$ is methyl or ethyl; or $R^1$ is H and $R^2$ is ethyl. In a second set of embodiments of Formula (2b), $R^1$ is methyl and $R^2$ is methyl, ethyl, n-propyl, or isopropyl; or $R^1$ is methyl and $R^2$ is methyl or ethyl; or $R^1$ is methyl and $R^2$ is ethyl. In a third set of embodiments of Formula (2b), $R^4$ and $R^5$ are independently selected from hydrogen atom, halogen atoms, $CH_3$, $CF_3$, OH, $OCH_3$, SH, and $SCH_3$; or $R^4$ and $R^5$ are independently selected from hydrogen atom, halogen atoms, $CH_3$, and $CF_3$; or one or both of $R^4$ and $R^5$ are hydrogen atoms. In some embodiments, any of the first or second embodiments provided above are combined with any of the third set of embodiments. In any of the foregoing combinations of embodiments, $R^7$, $R^8$, and $R^9$ are independently selected from hydrogen atom, halogen atoms, $CH_3$, $CF_3$, OH, $OCH_3$, SH, and $SCH_3$; or $R^7$, $R^8$, and $R^9$ are independently selected from hydrogen atom, halogen atoms, $CH_3$, and $CF_3$; or one, two, or all of $R^7$, $R^8$, and $R^9$ are hydrogen atoms.

In particular embodiments, the compound of Formula (2b) has the following structure:

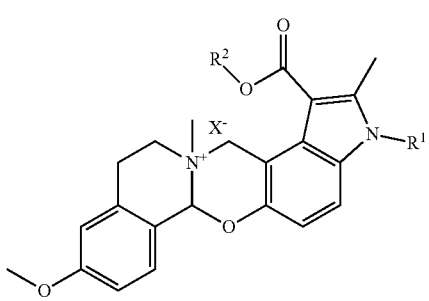

(2c)

In Formula (2c) above, any of the first and second embodiments, as described above for $R^1$ and $R^2$ under Formula (2b), are possible.

In some embodiments, the M4-specific antagonist has a pKi of at least $6.0 \times 10^{-6}$ M for binding to M4. In some embodiments, the M4-specific antagonist has a selectivity of at least 5-fold, 10-fold, 15-fold, 20-fold, or 25-fold for any one, two, three, or all of M1/M4, M2/M4, M3/M4 and M5/M4.

Compounds described herein may be formed as, and/or used as, pharmaceutically acceptable salts. The pharmaceutically acceptable salts can result from reaction of the neutral compound (i.e., with a ring nitrogen on the indolyl and/or isoquinolinyl rings) with an electrophilic organic species or a pharmaceutically acceptable organic or inorganic acid. In this way, one or both of the indolyl and/or isoquinolinyl ring nitrogens are protonated or alkylated. Some examples of electrophilic organic species include the alkyl halides, such as methyl bromide, ethyl bromide, n-propyl bromide, and isopropyl bromide. Some examples of organic acids include acetic acid, propionic acid, butanoic acid, glycolic acid, pyruvic acid, lactic acid, malonic acid, malic acid, citric acid, succinic acid, maleic acid, tartaric acid, fumaric acid, trifluoroacetic acid, benzoic acid, cinnamic acid, mandelic acid, methanesulfonic acid, ethanesulfonic acid, 1,2-ethanedisulfonic acid, 2-hydroxyethanesulfonic acid, benzenesulfonic acid, toluenesulfonic acid, 2-naphthalenesulfonic acid, 3-phenylpropionic acid, trimethylacetic acid, gluconic acid, glutamic acid, salicylic acid, hydroxynaphthoic acid, stearic acid, muconic acid, and the like. Some examples of inorganic acids include hydrochloric acid, hydrobromic acid, hydroiodic acid, sulfuric acid, nitric acid, phosphoric acid, metaphosphoric acid, and the like. The anion ($X^-$) can be any of the anions associated with the above acid or electrophilic species, or the anion may result from an exchange thereof with any other pharmaceutically acceptable anions of the art.

In some embodiments, the pharmaceutically acceptable salt may result from deprotonation of $R^6$ when $R^6$ is a hydrogen atom. The deprotonation typically results by reaction of the neutral compound with a base of suitable strength to deprotonate a phenol (i.e., the $-OR^6$ group). The base may be, for example, a hydroxide of an alkali metal (e.g. lithium, sodium, potassium), hydroxide of an alkaline earth metal (e.g. magnesium, or calcium), or hydroxide of aluminum.

Any of the compounds described above may also be a solvate. As known in the art, a solvate is an adduct of a compound with one or more solvent molecules. For purposes of the present invention, the solvent molecule should be pharmaceutically acceptable. Some examples of pharmaceutically acceptable solvent molecules include water, alcohols (e.g., ethanol), and glycols (e.g., ethylene glycol and propylene glycol). In the case of the solvent molecule being water, the solvate is typically referred to as a hydrate. The compounds may also be in any polymorphic form, e.g., amorphous, single crystalline, or polycrystalline. The crystalline form may also be one of several possible crystalline forms governed by, for example, the crystal packing and crystallographic (symmetry) space group. Pharmaceutical solvates, hydrates, polymorphs, and crystalline forms are described in, for example, A. M. Healy et al., *Advanced Drug Delivery Reviews*, 117, 25-46, 2017 and S. L. Morissette et al., *Advanced Drug Delivery Reviews*, 56, 275-300, 2004, the contents of which are herein incorporated by reference in their entirety.

Pharmaceutical Compositions Containing M4-Specific Antagonists

Typically, in order for the M4 antagonist compound to be administrable to a subject, the compound is formulated together with one or more pharmaceutically acceptable carriers (additives) and/or diluents, as well known in the art of pharmaceutical compositions. The pharmaceutical compositions of the present invention may be specially formulated for administration in solid or liquid form, including those adapted for the following: (1) oral administration, for example, drenches (aqueous or non-aqueous solutions or suspensions), tablets, e.g., those targeted for buccal, sublingual, and systemic absorption, boluses, powders, granules, pastes for application to the tongue; (2) parenteral administration, for example, by subcutaneous, intramuscular, intravenous or epidural injection as, for example, a sterile solution or suspension, or sustained-release formulation; (3) topical application, for example, as a cream, ointment, or a controlled-release patch or spray applied to the skin; (4) sublingually; (5) ocularly; (6) transdermally; or (7) nasally.

The phrase "pharmaceutically acceptable" is used herein to refer to those compounds, materials, compositions, and/or dosage forms that are, within the scope of sound medical judgment, suitable for entering a living organism or living biological tissue, preferably without significant toxicity, irritation, or allergic response. The phrase "pharmaceutically-acceptable carrier", as used herein, generally refers to a pharmaceutically-acceptable composition, such as a liquid or solid filler, diluent, excipient, manufacturing aid (e.g., lubricant, talc magnesium, calcium or zinc stearate, or steric acid), or solvent encapsulating material, useful for introducing the active agent into the body. Each carrier must be "acceptable" in the sense of being compatible with other ingredients of the formulation and not injurious to the patient. Examples of suitable aqueous and non-aqueous carriers that may be employed in the pharmaceutical compositions of the invention include, for example, water, ethanol, polyols (such as glycerol, propylene glycol, polyethylene glycol, and the like), vegetable oils (such as olive oil), and injectable organic esters (such as ethyl oleate), and suitable mixtures thereof. Proper fluidity can be maintained, for example, by the use of coating materials, such as lecithin, by the maintenance of the required particle size in the case of dispersions, and by the use of surfactants.

Other examples of materials that can serve as pharmaceutically-acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) pH buffered solutions; (21) polyesters, polycarbonates and/or polyanhydrides; and (22) other non-toxic compatible substances employed in pharmaceutical formulations.

A tablet may be made by compression or molding, optionally with one or more auxiliary ingredients. Compressed tablets may be prepared using binder (for example, gelatin or hydroxypropylmethyl cellulose), lubricant, inert diluent, preservative, disintegrant (for example, sodium starch glycolate or cross-linked sodium carboxymethyl cellulose), surface-active or dispersing agent. The tablets, and other solid dosage forms of the active agent, such as capsules, pills and granules, may optionally be scored or prepared with coatings and shells, such as enteric coatings and other coatings well known in the pharmaceutical-formulating art. The dosage form may also be formulated so as to provide slow or controlled release of the active ingredient therein using, for example, hydroxypropylmethyl cellulose in varying proportions to provide the desired release profile, other polymer matrices, liposomes and/or microspheres. The dosage form may alternatively be formulated for rapid release.

Use of M4-Specific Antagonists

In one embodiment, an M4-specific antagonist is administered to a subject for treating a disease or condition resulting from muscarinic acetylcholine receptor subtype 4 (M4) activity, such as anemia. The term "treating" or "treatment", as used herein, includes amelioration, slow down the progression, correction, prevention, or delay of recurrence of a disease or condition. For example, treatment of anemia can reduce the severity of anemia including one or more symptoms associated with anemia (e.g., fatigue, shortness of breath), as reflected by restoring or maintaining levels of hemoglobin, hematocrit, and/or red blood cell (RBC) count.

In some embodiments, a method of treating anemia or other disease or condition is accomplished by administering a pharmaceutically effective amount of an M4 antagonist to a subject in need thereof. The M4-specific antagonist can be any of the M4 antagonist compounds described above, including any of the structures within the scope of Formulas (1) and (2) and sub-formulas therein.

Subjects in need of the present treatment include any subject, particularly human subjects, who suffers from or is at risk of anemia or other disease or condition resulting from M4 activity. In some embodiments, a subject suffers from an Epo-resistant anemia, which is an anemia where administration of Epo does not result in a desired response or would not be expected to result in a desired response. Whether the anemia in a subject is Epo-resistant or not can be determined by evaluating Hb or hemacrit in the subject after a standard treatment with recombinant human EPO. For example, the anemia in a subject is considered to be an Epo-resistant anemia if after receiving a standard treatment with recombinant human EPO, the subject fails to reach levels of at least 12 g/dL Hb, fails to achieve an increase of more than 2 g/dL in levels of Hb, or fails to maintain a Hb concentration of at least 10 g/dL. As another example, the anemia in a subject is considered to be an Epo-resistant anemia if after receiving a standard treatment with recombinant human EPO, the subject fails to raise hematocrit to at least 30%, 32%, 34%, 36% or 38%.

Anemia in a subject may result from different causes. In some embodiments, the anemia in a subject is associated with hemolysis (i.e., hemolytic anemia). In some embodiments, the anemia in a subject is associated with myelodysplastic syndromes (MDS). In some embodiments, the anemia in a subject is associated with aging. Thus, in some embodiments, the present treatment is provided to a human subject of at least 60, 65, 70, 75, 80, or 85 years old. In other embodiments, anemia is expected; e.g., in a subject expected to undergo a surgery, chemotherapy, or radiation therapy. The M4 antagonist may also be used to treat a condition or disease that may not technically qualify as anemia but that is characterized by anemia-like symptoms. A hemolysis model is able to confirm the general anti-anemia activity of the compound in vivo.

An M4-specific antagonist is administered to a subject in need thereof in a therapeutically-effective amount (i.e., therapeutically-effective dosage). The term "therapeutically-effective amount" or "therapeutically-effective dosage", as used herein, corresponds to an amount of active agent effective for providing any of the desired therapeutic effects described above, preferably without a substantial toxic effect to the subject. In particular embodiments, an effective amount is an amount adequate to achieve an increase in Hb, hematocrit or RBC count to a desired level or an increase of Hb, hematocrit or RBC count by a desired amount, or more particularly, a reduction in one or more symptoms of anemia. The precise amount to be effective may vary depending on the structure and pharmacological profile of a compound. It may be useful to evaluate an M4-specific antagonist by, for example, assessing its effect on the self-renewal and expansion of BFU-E in culture, and its pharmacological characteristics (such as half-life in plasma), in order to determine an effective amount for such antagonist. In some embodiments, an M4-specific antagonist is administered in a single dose. In some embodiments, an M4-specific antagonist is administered in multiple doses, e.g., 2, 3, or more times a day, every other day, weekly, biweekly, or monthly. Particularly for systemic modes of administration, the dosage can be, for example, in the range of about 0.01, 0.1, 0.5, 1, 5, or 10 mg per kg of body weight per day to about 20, 50, 100, 500, or 1000 mg per kilogram of body weight per day, or bi-daily, or twice, three, four, or more times a day. Generally, the effective amount of a small molecule compound can fall in the range of 1 µg to 5000 mg, 10 kg to 1000 mg, 10 kg to 10 mg, 100 kg to 500 kg once or multiple times per day, per week, or per month. In some embodiments, doses may range from about 1, 5, 10, 20, 50, 100 µg/kg/day, or 1, 5, 10, 15, 20, 50, 100, 150, 200 mg/kg/day, or any value of range of values between the stated doses.

M4-specific antagonists can be administered to a subject by standard routes, including oral, nasal, transdermal, parenteral (e.g., intravenous, intraperitoneal, intradermal, subcutaneous or intramuscular) routes. In a specific embodiment, an M4-specific antagonist is given to a subject via oral administration.

An M4-specific antagonist can be provided or admixed with a pharmaceutically acceptable carrier for suitable administration. As discussed above, a pharmaceutically acceptable carrier includes any and all solvents, dispersion media, isotonic agents and the like. The carrier can be liquid, semi-solid, e.g. pastes, or solid carriers. Examples of carriers include oils, water, saline solutions, alcohol, sugar, gel, lipids, liposomes, resins, porous matrices, binders, fillers, coatings, preservatives and the like, or combinations thereof.

In other embodiments, an M4-specific antagonist is utilized to promote self renewal of burst forming unit erythroid (BFU-E) cells by contacting the BFU-E cells with the M4-specific antagonist. The BFU-E cells may be, for example, within a living (e.g., human) subject when contacted with the M4-specific antagonist, or the BFU-E cells may taken from a subject and contacted with the M4-specific antagonist ex vivo. The M4-specific antagonist can be any M4-specific antagonist, including any of the M4-specific antagonists described above. In particular embodiments, the increased self-renewal of the BFU-E cells is used to treat anemia in a subject. In some embodiments, self-renewal of BFU-E cells is increased as a result of being contacted with an M4-specific antagonist by at least 50%, 100%, 2 fold, 3 fold, 4 fold, 5 fold, 6 fold, 7 fold, 8 fold, 9 fold, 10 fold or greater.

Examples have been set forth below for the purpose of illustration and to describe certain specific embodiments of the invention. However, the scope of this invention is not to be in any way limited by the examples set forth herein. The contents of all cited references (including literature references, issued patents, and published patent applications as cited throughout this application) are hereby expressly incorporated by reference.

Example 1

This Example describes experiments conducted to investigate the role of the muscarinic acetylcholine receptor CHRM4 pathway in BFU-E self-renewal, and the effects of a small molecule muscarinic acetylcholine receptor inhibitor, oxyphenonium bromide, on anemia in mouse models.

Results

To identify G-protein-coupled receptors ("GPCRs") that regulate BFU-E self-renewal, genome-wide gene expression profiles were analyzed, with a focus on GPCRs that are abundantly expressed in BFU-Es. To further narrow down a candidate list to GPCRs that are most likely to be functionally important for the regulation of BFU-E self-renewal versus differentiation, the inventors utilized the notion that differentiation and self-renewal are two opposite cell fates with likely contrasting gene expression profiles.

Among the 358 druggable GPCRs examined, 3 GPCRs including P2ry2, Gpr124, and Calcrl were found to be downregulated during BFU-E differentiation and upregulated during self-renewal; 3 GPCRs including Chrm4, Fzd5, and Darc were found to be upregulated during BFU-E differentiation and downregulated during self-renewal. For GPCRs upregulated during BFU-E self-renewal, small chemical compounds that act as agonists of these GPCRs were tested; and for GPCRs downregulated during BFU-E self-renewal, antagonists were tested for their capacities to promote BFU-E self-renewal and expansion. Of all the small chemical compounds tested, oxyphenonium bromide and orphenadrine citrate, two closely related muscarinic acetylcholine receptor antagonists, triggered BFU-E expansion (FIGS. 1A-1B).

It has been shown previously that one BFU-E generates ~500 erythrocytes. When cultured in the presence of 100 µM oxyphenonium bromide, BFU-E underwent prolonged expansion resulting in the production of ~10 fold more erythrocytes (FIGS. 1A-1B). After 12 days of culture, the majority of cultured cells underwent terminal differentiation, and there was no difference in the percentage of Ter119+ differentiated cells between culture conditions with or without oxyphenonium bromide, suggesting that all the cells are Ter119+ differentiated erythroid lineage cells in culture conditions with or without oxyphenonium bromide (FIG. 1C). As shown in FIG. 1D, Day 6 cultured BFU-Es were plated on methylcellulose medium and the numbers of BFU-E colony formed counted 9 days later. The presence of oxyphenonium bromide triggered ~2 fold formation of BFU-E colonies. In the human CD34+ hematopoietic stem and progenitor cell (HSPC) culture system, oxyphenonium bromide also promoted a ~2 to 4 fold expansion of erythroid cells (FIG. 1E). Together, this suggests that muscarinic acetylcholine receptor antagonist oxyphenonium bromide increases erythrocyte production by promoting BFU-E self-renewal.

Figures 2A, 2B, 2C, 2D:
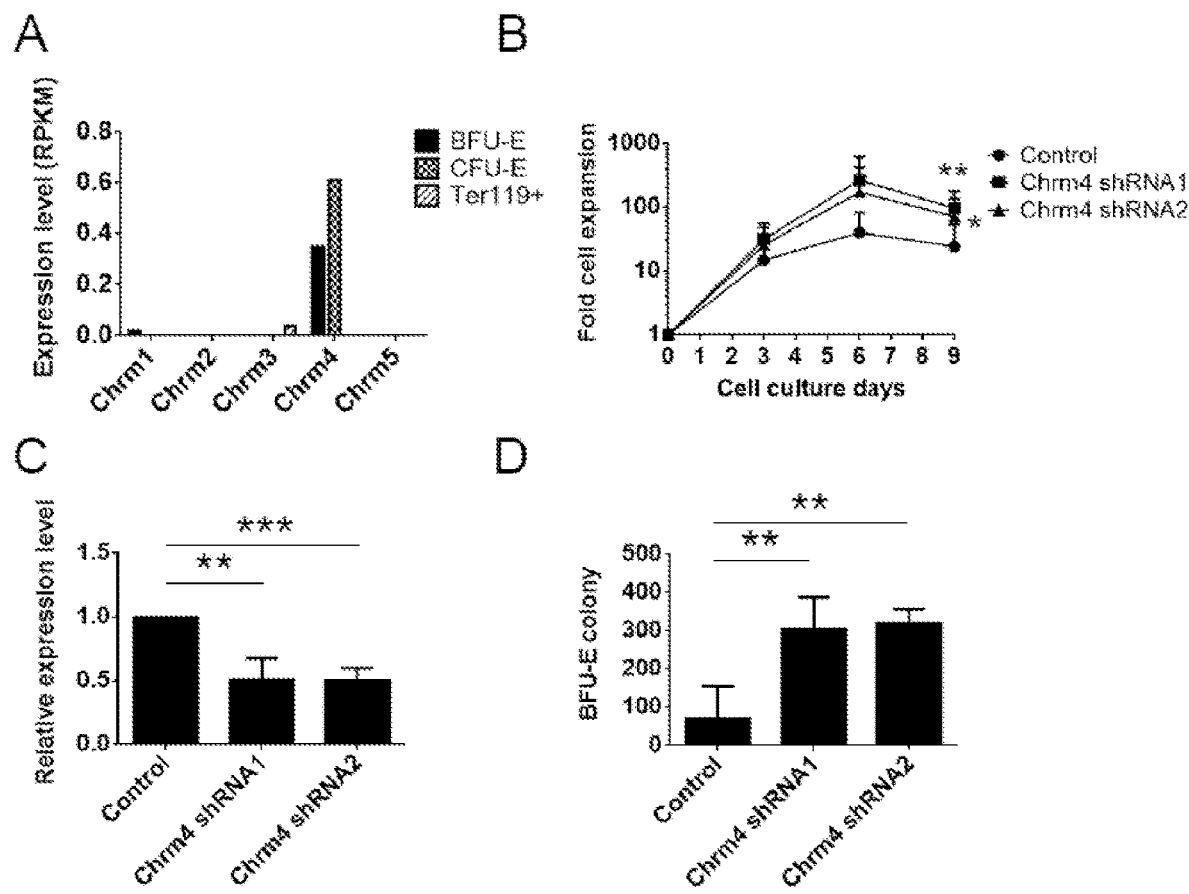
FIGS. 2A-2D. CHRM4 negatively regulates BFU-E self-renewal.

Chrm4 was shown herein to be the most abundant member of the muscarinic acetylcholine receptor family expressed in BFU-Es (FIG. 2A). Among all the cell types tested, erythroid progenitor was found to have the second most abundant expression of Chrm4, right behind retinal cells where a functional role of Chrm4 is well established. Chrm4 was found to be upregulated during erythroid differentiation from the BFU-E to CFU-E stage and downregulated during self-renewal (FIG. 2A). As shown in FIG.

2B-2D, knockdown of Chrm4 using two independent shRNAs targeting Chrm4 promoted BFU-E expansion. One BFU-E infected with virus encoding control shRNA generated ~100 erythroid cells, while BFU-Es infected with virus encoding shRNA targeting Chrm4 generated ~3-5 fold more erythroid cells. This recapitulates the positive effect of oxyphenonium bromide on BFU-E expansion (FIG. 1B). Consistently, knockdown of Chrm4 also upregulated the expression of self-renewal markers, such as Zfp36l2 (FIG. 2E).

Figures 3A, 3B, 3C, 3D:
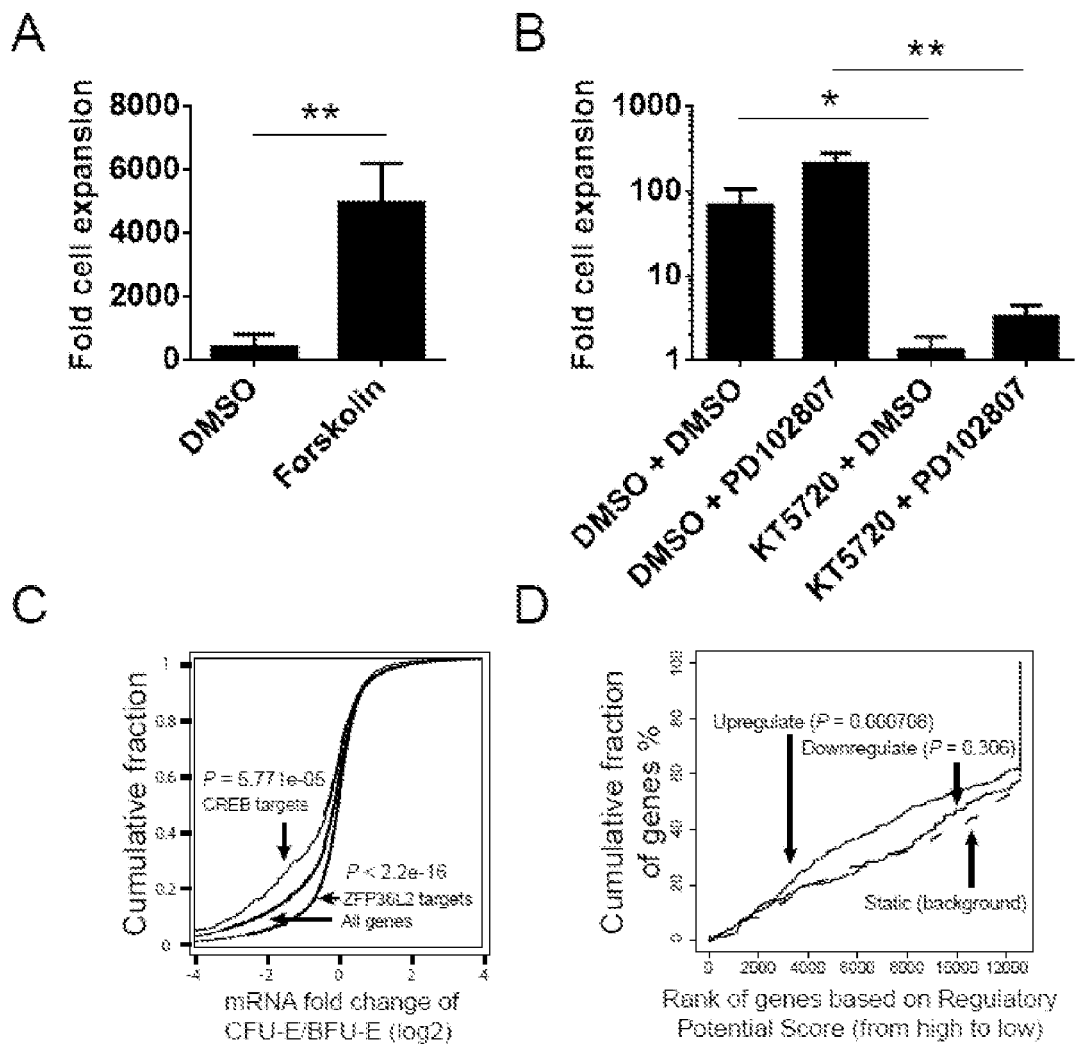
FIGS. 3A-3D. CHRM4 pathway regulates genes important for the maintenance of BFU-E progenitor status.

It has been reported that a muscarinic acetylcholine antagonist inhibits the CHRM4 pathway by raising cyclic AMP (cAMP) level and by regulating the CREB transcriptional program (Kruse et al., Nat Rev Drug Discov 13, 549-560 (2014); Wess et al., Nat Rev Drug Discov 6, 721-733 (2007); Shaywitz, Annu Rev Biochem 68, 821-861 (1999)). Consistently, culture of BFU-Es with an adenylate cyclase activator forskolin was shown herein to promote BFU-E expansion (FIG. 3A). In addition, phosphorylated CREB displayed an increase in nuclear localization upon oxyphenonium bromide treatment (FIG. 3B). These results suggest that CREB may serve as a factor for regeneration and for correcting stem and progenitor cell exhaustion in the elderly.

To identify direct target genes of CREB, ChIP-Seq was performed on BFU-Es. The RNA binding protein ZFP36L2 has been reported to preferentially bind to mRNAs of genes induced during erythroid differentiation and triggers their degradation, which in turn contributes to self-renewal. In contrast to ZFP36L2, CREB was found to preferentially bind to genomic loci near genes that are highly expressed in BFU-Es (FIG. 3C) and triggered the upregulation of these genes (FIG. 3D), through which CREB is believed to contribute to BFU-E progenitor status maintenance. These genes include transcription factor Gata2 (FIG. 3E) which is sufficient to induce erythroid progenitor expansion (Tsai et al., Blood, 89, 3636-3643 (1997)) and RNA-Binding protein Zfp36l2 which is indispensable for the maintenance of BFU-E progenitor status (Zhang et al., Nature 499, 92-96 (2013)). Together, these results indicate that the CHRM4-CREB pathway promotes BFU-E self-renewal by upregulating the expression of genes important for the maintenance of BFU-E progenitor status.

In summary, the experiments described above have shown that the muscarinic acetylcholine receptor CHRM4 pathway is a crucial regulator of BFU-E self-renewal; and that muscarinic acetylcholine receptor antagonist oxyphenonium bromide triggers BFU-E self-renewal and expansion. The experiments have also shown that in hemolysis, MDS, and aging mouse models, the muscarinic acetylcholine receptor antagonist corrects anemia in vivo. In addition, the experiments have shown that the downstream transcription factor CREB mediates muscarinic acetylcholine receptor's effects in promoting BFU-E self-renewal.

Material and Methods

Primary mouse BFU-Es were isolated from mouse embryonic day 14.5 (E14.5) fetal liver and cultured in StemSpan serum-free expansion medium, and the numbers of cells formed were counted during culture. BFU-Es were infected with either viruses encoding control shRNA or viruses encoding shRNAs targeting Chrm4, and numbers of GFP+ cells formed during culture were counted. DMSO or 25 mg/kg oxyphenonium bromide was intraperitoneally injected into the hemolysis mouse model, Mx1-cre Srsf2 P95H/WT MDS mouse model, and aging mouse model. Complete blood count (CBC) was performed after compound injection. CREB ChIP-Seq was performed on BFU-Es after culture with 100 µM oxyphenonium bromide for 45 minutes. RNA-Seq was performed in BFU-Es after being cultured with DMSO or oxyphenonium bromide for 3 days.

BFU-E Isolation and Culture System

BFU-Es were isolated from mouse embryonic day 14.5 fetal liver using fluorescence-activated cell sorting (FACS) method previously described (Flygare et al., Blood 117, 3435-3444 (2011)). BFU-Es were cultured in StemSpan SFEM II medium containing rmSCF (100 ng/ml), EPO (2 U/ml), rmIGF-1 (40 ng/ml), dexamethasone (1 nmol/ml or 10 nmol/ml), oxyphenonium bromide (100 µmol/ml), and orphenadrine citrate (1 µmol/ml).

BFU-E Colony Formation, Ter119 Antibody Staining, and Retrovirus Infection Assays After 3 days of culture, cultured cells were placed in methylcellulose medium Methocult SF M3436 and BFU-E colonies were counted after 9 days. On day 14 of culture, cultured cells were stained with Ter19-APC antibody and the percentage of Ter119+ cells was measured by flow cytometry. For retrovirus infection, BFU-Es were infected with virus encoding either control shRNA or shRNAs targeting Chrm4.

Human CD34+ Cell Culture, Counting and Colony Formation Assays

Human CD34+ hematopoietic stem and progenitor cells (HSPCs) were cultured in StemSpan™ SFEM medium containing rhSCF (20 ng/ml), rhIL-3 (5 ng/ml) and EPO (1 U/ml) with various concentrations of dexamethasone and oxyphenonium. Total numbers of cells were counted using a flow-cytometer. For colony formation assay, day 8 cultured cells were plated into methylcellulose medium MethoCult™ H4034 Optimum and BFU-E colonies were counted after 13 days.

PHZ Induced Hemolytic Anemia Mouse Model 4-6 weeks old C57bl/6 mice were intraperitoneally injected with either control DMSO or compound every day for 3 days. On day 4, mice were intraperitoneally injected with 60 mg/kg PHZ. Mice were then intraperitoneally injected with either compound or control DMSO every day for another 3 days. Peripheral blood samples were collected retro-orbitally using heparinized capillary tubes in blood collection tubes with K2-EDTA. CBC was performed using Hemavet® 950.

BFU-E Colony Formation and Flow Cytometry Assays of Spleen Cells 4-6 week old C57bl/6 mice were intraperitoneally injected with either compound or control DMSO every day for 3 days. On day 4, mice were intraperitoneally injected with 60 mg/kg PHZ. Mice were then intraperitoneally injected with either compound or control DMSO every day for another 2 days. Mouse spleens were dissected and homogenized for single cell suspension. Red blood cells were lysed by incubating the cell suspension with ammonium chloride solution on ice for 5 min. Spleen cells were then either placed in methylcellulose medium Methocult SF M3436 and BFU-E colonies were counted after 9 days or stained with Ter119-APC antibody followed with flow cytometry analysis.

Conditional Knock-In Cre-Mx1 Srsf2 P95H/WT MDS Mouse Model and Aging Mouse Model For MDS mouse model, bone marrow cells were harvested from freshly dissected femora and tibiae of Mx1-cre Srsf2 fl/WT and Mx1-Cre Srsf2 P95H/WT mice as previously described (Kim et al., Cancer Cell 27, 617-630 (2015)). $1 \times 10^6$ bone marrow cells, either from Mx1-cre Srsf2 fl/WT or Mx1-Cre Srsf2 P95H/WT mice, were transplanted into lethally irradiated (450 cGy twice) CD45.1 recipient mice via tail vein injection. 3 weeks after transplantation, polyL:polyC (pIpC) was injected to induce Mx1-cre expression. After confirming MDS disease phenotype, mice are intraperitoneally injected with either compound or control DMSO every day for 45 days. Peripheral blood samples are collected retro-orbitally for CBC using Hemavet 950.

For the aging mouse model, CBC was performed on 6-8 week or 18-21 month old C57bl/6 mice. 18-21 month old mice are intraperitoneally injected with either compound or control DMSO every day. Blood samples are collected on day 7 for CBC.

RNA Sequencing

For RNA isolation, BFU-Es were cultured in SFEM II containing SCF (100 ng ml-1), EPO (2 Uml-1), IGF-1 (40 ng ml-1) and dexamethasone (1 nM) at 37° C. either with oxyphenonium (100 µM) or DMSO control. Cells were collected on day 3, and RNAs were isolated using RNeasy® mini kit (Qiagen). Sequencing libraries were generated using RNA-Seq sample preparation kit v2 (Illumina) and sequenced by HiSeq® 2500 platform (Illumina). STAR mapper was used to map back sequence reads to the mouse genome (GRCm38, mm10). Reads were de-multiplexed in line with their adapters and used for different post mapping analyses.

Chromatin Immunoprecipitation Sequencing (ChIP-Seq)

ChIP-Seq was performed using ChIP-IT High Sensitivity Kit (Active Motif). $5 \times 10^6$ BFU-Es were isolated from E14.5 fetal livers of mice. BFU-Es were cultured in StemSpan SFEM II medium containing SCF (100 ng ml$^{-1}$), EPO (2 Uml$^{-1}$) and IGF-1 (40 ng ml$^{-1}$) at 37° C. Cells were treated with oxyphenonium (100 µM) for 45 min. After treatment, cells were crosslinked with 1% formaldehyde solution for 15 min at room temperature with gently shaking. Crosslinking was quenched using freshly prepared 2.5 M glycine solution for 5 min at room temperature. Cells were lysed using nuclei lysis buffer and sonicated for 30 min, 3×10 min cycle with 30 sec ON and 30 sec OFF, using Bioruptor® 2000 (Diagenode). Small amount of samples were taken (30 µl) and reverse crosslinked using Proteinase K and RNase A, run on 2% agarose gel to check sonicated fragment size. Sonicated DNA were then placed overnight on a tube rotator at 4° C. with either IgG control (10 µg, EMD Millipore 17-600) or CREB antibody (10 µg, EMD Millipore, 17-600). DNA solutions were incubated with Agarose G beads for 4 hours at 4° C., elution and purification of immune-precipitated DNA was performed using DNA elution and purification columns (Active Motif).

Sequencing libraries were generated using TruSeq® ChIP-Seq sample preparation kit (Illumina). Briefly, after repairing the ends, adapters were ligated and DNA samples with adapters were purified by collecting DNA fractions between 250-300 bp using Size-select 2% agarose gel electrophoresis system (Invitrogen). Purified DNA libraries were amplified, for 18 cycles using PCR amplification kit (Illumina), and purified using AMPure XP magnetic beads (Beckman Coulter). Size of the sequencing library was verified using high sensitivity DNA chip in Bioanalyzer™ 2100 (Agilent). Sequence reads were aligned using Bowtie2 to mouse genome (GRCm38, mm10) and de-multiplexed according to their adapter sequences. MACS platform was used for peak calling. Binding and expression target analysis (BETA) was performed as previously described (Wang et al., Nat Protoc 8, 2502-2515 (2013)).

RT-PCR

For RT-PCR, reverse transcription was performed using SuperScript reverse transcriptase III (Invitrogen). PCR was performed using SYBR® Green PCR master mix (Life Technologies) and 7900HT™ Real Time PCR system (Applied Biosystems). Primer sequences are: Gapdh, forward primer, CATGGCCTTCCGTGTTCCTA (SEQ ID NO: 1), reverse primer, GCGGCACGTCAGATCCA (SEQ ID NO: 2); Chrm4, forward primer, ATGGCGAACTT-CACACCTGTC (SEQ ID NO: 3), reverse primer, CTGTCGCAATGAACACCATCT (SEQ ID NO: 4); C-Kit, forward primer, GGCCTCACGAGTTCTATTTACG (SEQ ID NO: 5), reverse primer, GGGGAGAGATTTCCCAT-CACAC (SEQ ID NO: 6); Zfp36l2, forward primer, AGCGGCTCCCAGATCAACT (SEQ ID NO: 7), reverse primer, CGAAAGCGAAGGCGTTGTTA (SEQ ID NO: 8).

Immunofluorescence

Freshly isolated BFU-Es were serum starved for 1 hour and treated with either DMSO or 100 µM oxyphenonium for 45 to 60 min. $10^4$ cells were collected on Poly L-Lysine coated slides using cytospin. Cells were fixed with 2% paraformaldehyde for 15 min, followed with permeabilization using 0.1% Triton X-100 for 15 min and with 2% BSA solution block for 30 min. Cells were incubated with phospho-CREB antibody (phospho S133, Abcam, ab32096, 1:250) in 2% BSA for 1 hour and then incubated with FITC conjugated goat anti-mouse secondary antibody (Abcam, ab97022, 1:500) and FITC conjugated goat anti-rabbit secondary antibody (Abcam, ab97050, 1:500) in 2% BSA solution for 30 min. Cells were then incubated with DAPI for 5 min and then mounted with mounting solution.

Plasmids

The following oligos were annealed and cloned into MSCV-IRES-GFP vector digested with BbsI: Chrm4 shRNA1, aaaaTCTGATGAAGCCGACATTAAgtcgacT-TAATGCTCGGCTTCATCAGA (SEQ ID NO: 9); Chrm4 shRNA2, aaaaCCATCTTGTTCTGGCAGTTTGgtcgac-CAAACTGCCAGAACAAGATGG (SEQ ID NO: 10).

Example-2

This Example describes experiments conducted to investigate whether other small molecule M4 antagonists, such as PCS1055 and PD102807, promote BFU-E self-renewal and correct anemia in vivo.

Results

Figures 4A, 4B, 4C, 4D, 4E:
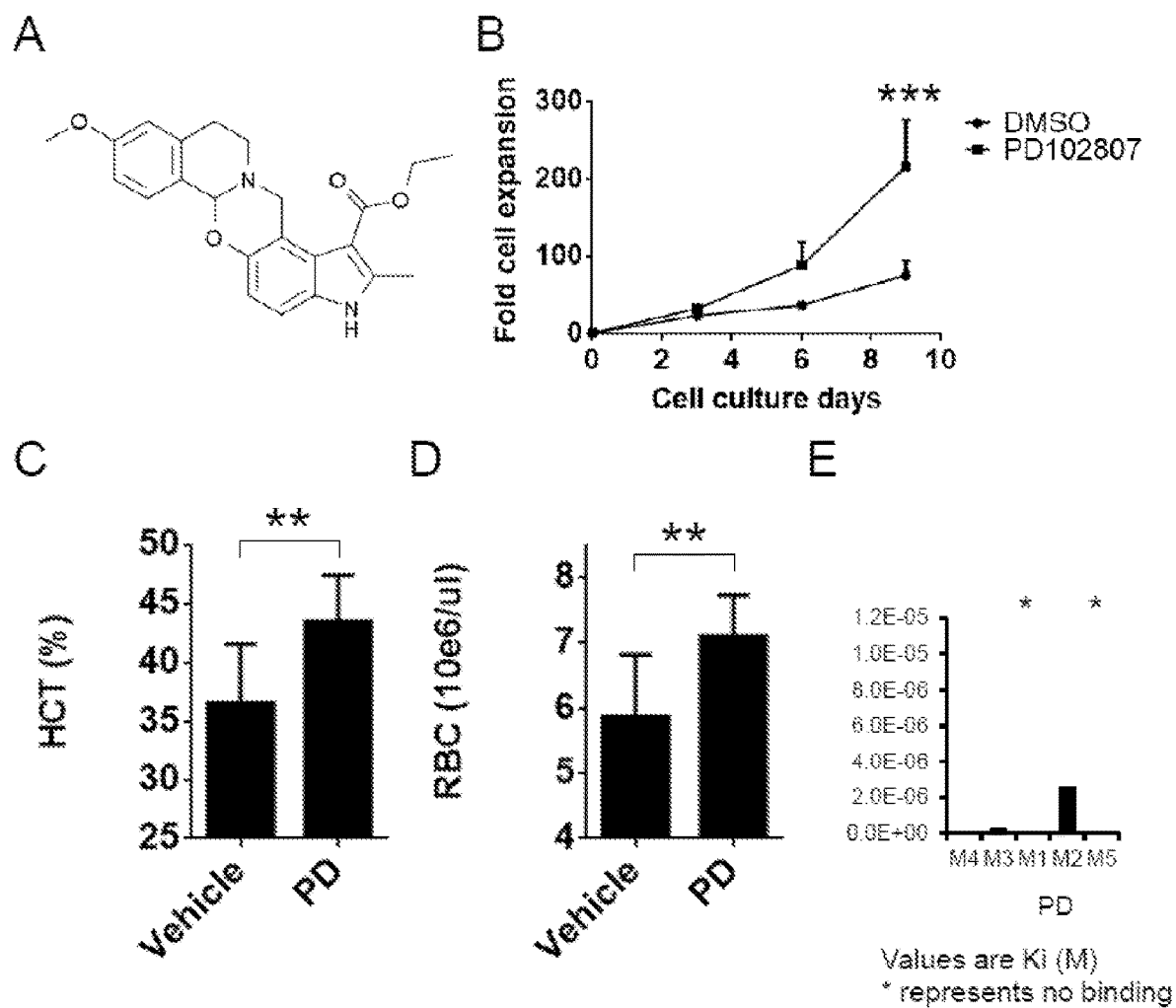
FIGS. 4A-4E. Compound PD102807 promotes BFU-E self-renewal and corrects anemia in vivo.

FIG. 4A shows the chemical structure of PD102807. PD102807 was found to increase the expansion of BFU-E cells in cell culture (FIG. 4B). In addition, PD102807 was also found to increase the levels of HCT and RBC when administered to mice (i.p. or oral for PD102807) (FIGS. 4C and 4D, respectively). FIG. 4E shows the results of testing PD102807 at concentrations of $1 \times 10^{-9}$ M, $1 \times 10^{-8}$ M, $1 \times 10^{-7}$ M, $1 \times 10^{-6}$ M, and $1 \times 10^{-5}$ M in standard binding assays with radioligands and cell membranes with receptors.

Materials and Methods

Mouse BFU-E Culture System

BFU-Es were isolated from mouse embryonic day 14.5 fetal liver using fluorescence-activated cell sorting (FACS) method. BFU-Es were cultured in StemSpan SFEM II medium containing rmSCF (100 ng/ml), EPO (2 U/ml), rmIGF-1 (40 ng/ml), dexamethasone (1 nM), together with either DMSO, PCS1055 (5 nM), or PD102807 (3 nM). Numbers of cell formed were counted during in vitro culture.

Anemia Mouse Model

Animal experiments were conducted in the Cold Spring Harbor Laboratory Animal Shared Resource in accordance with Institutional Animal Care and Use Committee-approved procedures. 4-6 weeks old C57bl/6 mice, purchased from Jackson Laboratory and randomly distributed into compound and control treatment groups, were given through oral delivery of PCS1055 (50 mg/kg or 100 mg/kg) twice per day or PD102807 (50 mg/kg or 100 mg/kg) once per day everyday for 3 days. On day 3, mice were intraperitoneally injected with 60 mg/kg PHZ. Mice were then given through oral delivery of PD102807 (50 mg/kg or 100 mg/kg) once per day every day for 2 days. Peripheral blood samples were collected retro-orbitally on day 6 using heparinized capillary tubes in blood collection tubes with K2-EDTA. CBC was performed using Hemavet 950.

Synthesis and Analysis of M4 Antagonist Compounds

Figure 5:
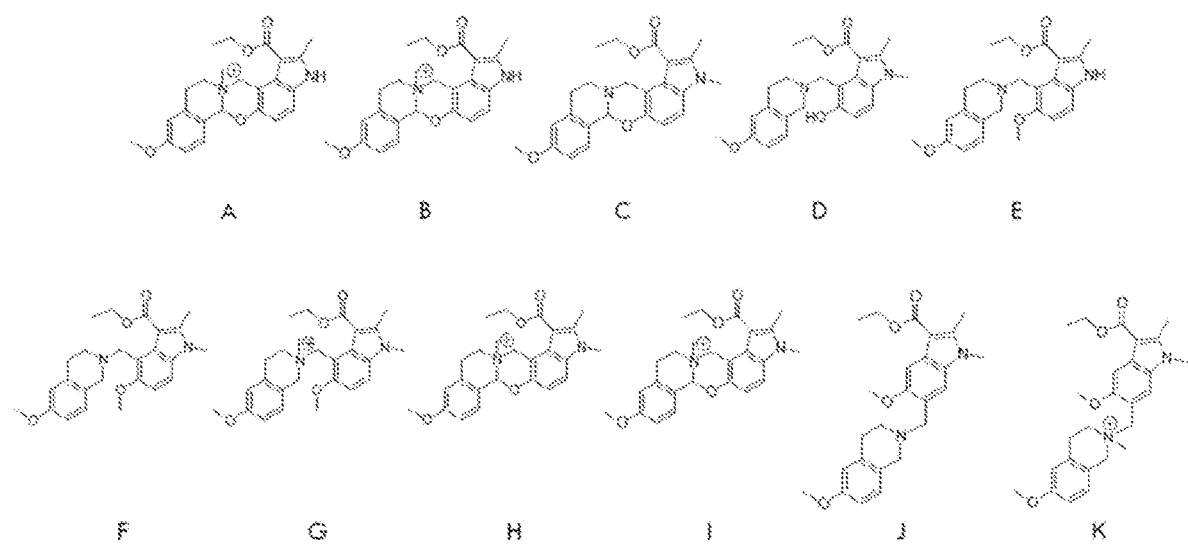
FIG. 5. Structures of a series of M4 antagonist compounds, designated as Compounds A-K.

A series of M4 Antagonist compounds, designated as Compounds A-K, were synthesized and analyzed. The structures of these compounds are shown in FIG. 5.

Syntheses of Compounds A-K

Unless otherwise mentioned, all starting materials were used directly from the supplier without further purification. All reactions were carried out in oven-dried glassware using syringe and septa techniques, NMR spectra were collected on 500 or 600 MHz machines. Chemical shifts are recorded relative to the deuterated solvent peak or the internal standard tetramethylsilane (TMS) peak at (δ 0.00) and are reported in parts per million (ppm). Assignments for selected nuclei were determined from $^1$H COSY. The purity of the final compounds was determined by HPLC analysis. Thin-layer chromatography (TLC) was done on 0.25 mm thick-coated silica gel aluminum sheets. TLC plates were observed under UV light with short and long wavelengths, or were observed after iodine staining, or were visualized by heating the plates upon exposure to a solution of ammonium (VI) molybdate tetrahydrate and cerium (IV) sulfate tetrahydrate. Flash column chromatography (FCC) was implemented using silica gel 60 (230-400 mesh) and employed a stepwise solvent polarity gradient, correlated with TLC mobility.

Ethyl 5-Hydroxy-2-methylindole-3-carboxylate
(Indole 1)

To a solution of 1,4-Benzoquinone (27 g, 0.25 mole) in 450 mL of glacial acetic acid was added ethyl 3-aminocrotonate (16.2 g, 0.125 mole) portion-wise by controlling the reaction temperature below 45° C. using ice-water bath. The reaction mixture was stirred at room temperature for 5 hours. The precipitated solid was washed with acetic acid and water to give 17 g (62%) of gray crystalline solid, further washing with acetic acid gave off white solid with 55% yield. $^1$HNMR (600 MHz, DMSOd$_6$) δ11.51 (s, 1H), 8.82 (s, 1H), 7.31 (d, J=2.4 Hz, 1H), 7.13 (d, J=8.52 Hz, 1H), 6.60 (dd, J=2.4, 8.6 Hz, 1H), 4.24 (q, J=7.08 Hz, 2H), 2.59 (s, 3H), 1.33 (t, J=7.08 Hz, 3H); $^{13}$C NMR (150 MHz, DMSOd$_6$) δ165.2, 152.2, 144.4, 128.9, 127.9, 111.4, 111.2, 105.2, 102.1, 58.4, 14.5, 13.8.

Ethyl 5-hydroxy-1,2-dimethyl-1H-indole-3-carboxylate
(Indole 2)

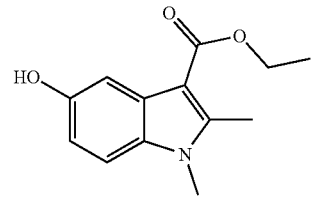 [SMILES: CCOC(=O)c1c(C)n(C)c2ccc(O)cc12]

To a solution of indole 1 (3.0 g, 13.76 mmol) in anhydrous DCM (100 mL) was added imidazole (2.0 g, 28.9 mmol) and TBDPS (3.7 mL, 14.45 mmol). The reaction mixture was stirred at RT for 16 hours. after the disappearance of the starting material based on the TLC, the reaction mixture was treated with 5% HCl solution. The organic phase was washed with brine, dried over Na$_2$SO$_4$, filtered, and evaporated under vacuum to give gray solid, which was used directly in the next step without further purification.

To a solution of the silylated derivative above (3.2 g, 7.0 mmol) in anhydrous DMF (10 mL) was added NaH (60% dispersed on oil) (440 mg, 10.5 mmol) and MeI (0.7 mL, 10.5 mmol). The reaction mixture was stirred at 0° C. and warmed up gradually to room temperature (RT) for 1 hour for the complete consumption of the starting material based on TLC. The reaction mixture was then treated with ice cold water and extracted with EtOAc (25 mL×4), the combined organic layer was washed with brine, dried over Na$_2$SO$_4$, filtered, and evaporated under vacuum to give crude material which was moved to the next step without purification.

To a solution of the methylated derivative prepared above (3.0 g, 6.4 mmol) in anhydrous THF (20 mL) was added 1M solution of TBAF (9.5 mL, 9.55 mmol). The reaction mixture was stirred at RT for 2 hours or until the disappearance of the starting material. The reaction mixture was mixed with 5% HCl solution and the aqueous layer was extracted with EtOAc (25 mL×3), the combined organic layer was washed with brine, dried over Na$_2$SO$_4$, filtered and evaporated under vacuum. The crude material was purified using flash chromatography to give white solid with 55% yield over 3 steps. $^1$HNMR (600 MHz, Acetoned$_6$) δ7.87 (s, 1H), 7.56 (d, J=2.28 Hz, 1H), 7.24 (d, J=8.7 Hz, 1H), 6.76 (dd, J=2.46, 8.7 Hz, 1H), 4.30 (q, J=7.14 Hz, 1H), 3.71 (s, 3H), 2.72 (s, 3H), 1.38 (t, J=7.14 Hz, 3H); $^{13}$C NMR (150 MHz, Acetond$_6$) δ166.3, 153.8, 146.2, 132.4, 128.7, 112.2, 112.1, 110.8, 107.0, 106.9, 103.7, 59.5, 15.1, 12.0.

Ethyl 5-methoxy-2-methyl-1H-indole-3-carboxylate
(Indole 3)

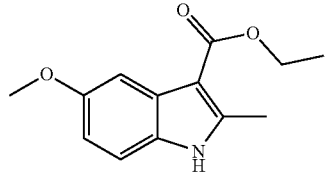 [SMILES: CCOC(=O)c1c(C)[nH]c2ccc(OC)cc12]

To a solution of indole 1 (3.0 g, 13.76 mmol) in anhydrous DCM (100 mL) was added imidazole (2.0 g, 28.9 mmol) and TBDPS (3.7 mL, 14.45 mmol). The reaction mixture was stirred at RT for 16 hours after the disappearance of the starting material based on the TLC. The reaction mixture was then treated with 5% HCl solution. The organic phase was washed with brine, dried over Na$_2$SO$_4$, filtered, and evaporated under vacuum to give gray solid, which was used directly in the next step without further purification.

To a solution of the silylated indole above (3.1 g, 6.8 mmol) in anhydrous THF (60 mL), was added di-tert-butyl dicarbonate (3.0 g, 13.6 mmol) and DMAP (85 mg, 0.68 mmol), the reaction mixture was heated to 50° C. with continuous stirring for 1 hour. Then the reaction mixture was mixed with water and extracted with EtOAc (25 mL×3). The combined organic layer was washed with brine, dried over Na$_2$SO$_4$, filtered, and evaporated under vacuum. After flash chromatography using EtOAc/hexane, the N-Boc protected indole was collected as a white solid (3.22 g, 85%).

To a solution of the N-boc protected indole prepared above (3.0 g, 5.4 mmol) in anhydrous THF (15 mL) was added 1M solution of TBAF (8.1 mL, 8.1 mmol). The reaction mixture was stirred at RT for 2 hours or until the disappearance of the starting material. The reaction mixture was mixed with 5% HCl solution and the aqueous layer was extracted with EtOAc (25 mL×3), the combined organic layer was washed with brine, dried over Na$_2$SO$_4$, filtered, and evaporated under vacuum. The crude material was purified using flash chromatography to give white solid with (1.45 g, 84.2% yield).

To a solution of the 5-hydroxy indole derivative above (1.0 g, 3.1 mmol) in anhydrous DMF (10 mL) was added NaH (60% dispersed on oil) (190 mg, 4.7 mmol) and MeI (0.3 mL, 4.7 mmol). The reaction mixture was stirred at 0° C. and warmed up gradually to RT over 1 hour for the complete consumption of the starting material based on TLC. The reaction mixture was then treated with ice cold water and extracted with EtOAc (25 mL×4), the combined organic layer was washed with brine, dried over Na$_2$SO$_4$, filtered, and evaporated under vacuum to give crude material which was purified by flash chromatography using EtOAc/Hexane to give (922 mg, 89% yield).

The 5-methoxy indole derivative prepared above (900 mg, 2.8 mmol) was treated with 4M HCl solution in dioxane (8 mL) and heated to 100° C. for 2 hours. After evaporation of the volatiles under vacuum, the crude material was subjected to flash chromatography purification using EtOAc/Hexane to give a white solid (340 mg, 52%) or 30% yield over five steps. $^1$HNMR (600 MHz, Acetoned$_6$) δ10.61 (bs, 1H), 7.60 (d, J=2.6 Hz, 1H), 7.25 (d, J=8.4, 1H), 6.77 (dd, J=2.5, 8.7 Hz, 1H), 4.33 (q, J=7.14 Hz, 2H), 3.81 (s, 3H), 2.69 (s, 3H), 1.40 (t, J=7.08 Hz, 3H); $^{13}$C NMR (150 MHz, Acetond$_6$) δ166.3, 156.4, 145.4, 131.0, 129.3, 112.4, 112.3, 104.7, 104.2, 59.6, 55.8, 15.0, 14.3.

Ethyl 5-methoxy-1,2-dimethyl-1H-indole-3-carboxylate (indole 4)

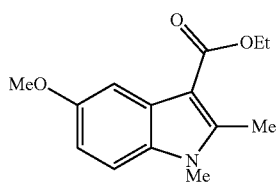 [SMILES: CCOC(=O)c1c(C)n(C)c2ccc(OC)cc12]

To a solution of the indole 1 (440 mg, 2.0 mmol) in anhydrous DMF (10 mL) was added NaH (60% dispersed on oil) (160 mg, 4.0 mmol) and MeI (570 μL, 10 mmol). The reaction mixture was stirred at 0° C. and warmed up gradually to RT for 30 minutes at which complete consumption of the starting material was observed based on TLC. Then the reaction mixture was treated with ice cold water and extracted with EtOAc (25 mL×4), the combined organic layer was washed with brine, dried over Na$_2$SO$_4$, filtered, and evaporated under vacuum to give crude material which was purified using FCC and EtOAc/Hexanes to afford 380 mg, 77% of the methylated indole 4. $^1$HNMR (600 MHz, Acetoned$_6$) δ 7.62 (d, J=2.6 Hz, 1H), 7.30 (d, J=8.8, 1H), 6.82 (dd, J=2.6, 8.9 Hz, 1H), 4.32 (q, J=7.1 Hz, 2H), 3.82 (s, 3H), 3.72 (s, 3H), 2.72 (s, 3H), 1.41 (t, J=7.14 Hz, 3H); $^{13}$C NMR (150 MHz, Acetond$_6$) δ166.3, 156.6, 146.3, 132.7, 128.5, 112.0, 111.0, 104.5, 104.1, 59.6, 55.8, 15.0, 12.1.

Ethyl 5-hydroxy-4-((6-methoxy-3,4-dihydroisoquinolin-2(1H)-yl)methyl)-2-methyl-1H-indole-3-carboxylate (Indole Derivative 5)

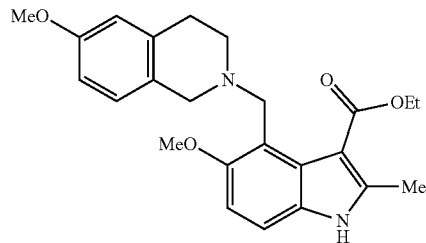 [SMILES: CCOC(=O)c1c(C)[nH]c2ccc(OC)c(CN3CCc4cc(OC)ccc4C3)c12]

To a solution of the indole 1 (30 mg, 0.135 mmol) in glacial acetic acid/water solution 5:1 (250 μL) was added 6-methoxy-tetrahydroisoquinoline (20 mg, 0.12 mmol) and formalin 37% solution (12 μL, 0.12 mmol). The reaction mixture was stirred at 90° C. for 30 minutes at which complete consumption of the starting material was observed based on TLC, then the reaction mixture was evaporated under vacuum to get rid of the acetic acid. The resulting crude material was dissolved in EtOAc (5 mL) and the organic layer was washed with saturated NaHCO$_3$ and brine. The organic layer was dried over Na$_2$SO$_4$, filtered, and evaporated, the resulting crude was subjected to FCC using 80% EtOAc/hexanes to afford (27 mg, 58%) of the titled compound. $^1$HNMR (600 MHz, CDCl$_3$) δ 8.27 (bs, 1H), 7.09 (d, J=8.6 Hz, 1H), 6.90 (d, J=8.5, 1H), 6.76 (d, J=8.6 Hz, 1H), 6.68 (dd, J=2.6, 8.4 Hz, 1H), 6.62 (d, J=2.6 Hz, 1H), 4.45 (s, 2H), 4.33 (q, J=4.3 Hz, 2H), 3.75 (m, 5H), 2.91 (bs, 3H), 2.59 (s, 3H), 1.38 (t, J=7.14 Hz, 3H); $^{13}$C NMR (150 MHz, CDCl$_3$) δ166.6, 158.4, 154.7, 143.0, 135.1, 129.5, 127.8, 126.2, 126.1, 113.7, 113.4, 112.5, 111.8, 110.7, 105.7, 60.1, 58.2, 55.5, 54.9, 50.1, 29.9, 29.5, 15.4, 14.8, 14.3.

Ethyl 9-methoxy-2-methyl-3,6a,11,14-tetrahydro-12H-indolo[4',5':5,6][1,3]oxazino[2,3-a]isoquinoline-1-carboxylate (Derivative 6)

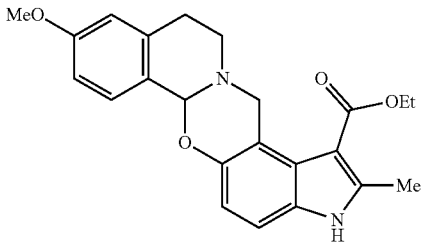 [SMILES: CCOC(=O)c1c(C)[nH]c2ccc3c(c12)CN1CCc2cc(OC)ccc2C1O3]

To a solution of the indole derivative 5 (2.2 g, 5.6 mmol) in absolute EtOH (12.0 mL) was added potassium acetate (602 mg, 6.14 mmol) and iodine (1.42 g, 5.6 mmol) dissolved in 2.0 mL of EtOH. The iodine solution was added dropwise at reflux temperature. Upon completion of the addition, the reaction mixture was stirred at the same temperature for an additional 30 minutes, and the reaction was quenched by treatment with saturated sodium thiosulfate solution until the disappearance of the iodine color. Then the reaction mixture was extracted with 5% MeOH/EtOAc (25 mL×4). The organic layer was washed with saturated NaHCO$_3$, brine, dried over Na$_2$SO$_4$, filtered, and evaporated, and the resulting crude was subjected to FCC using 5% MEOH/EtOAc to afford 1.45 g (6%) of the titled compound. $^1$HNMR (600 MHz, DMSOd$_6$) δ 11.63 (s, 1H), 7.30 (d, J=8.5 Hz, 1H), 7.10 (d, J=8.6 Hz, 1H), 6.82 (dd, J=2.6, 8.5, 1H), 6.76 (d, J=2.5 Hz, 1H), 6.55 (d, J=8.6 Hz, 1H), 5.64 (s, 1H), 4.70 (d J=17.6 Hz, 1H), 4.24 (m, 3H), 3.76 (s, 3H), 3.32 (m, 5H), 3.08-2.93 (m, 2H), 2.80-2.72 (m, 2H), 2.55 (s, 3H), 1.33 (t, J=7.14 Hz, 3H); $^{13}$C NMR (150 MHz, DMSOd$_6$) δ165.0, 159.1, 148.4, 143.4, 136.3, 129.6, 129.3, 126.3, 123.9, 112.7, 112.1, 112.0, 110.4, 110.1, 104.1, 85.0, 58.9, 55.0, 53.5, 43.6, 28.7, 14.4.

Compounds A & B: 1-(ethoxycarbonyl)-9-methoxy-2,13-dimethyl-3,6a,11,12,13,14-hexahydroindolo[4',5':5,6][1,3]oxazino[2,3-a]isoquinolin-13-ium Iodide

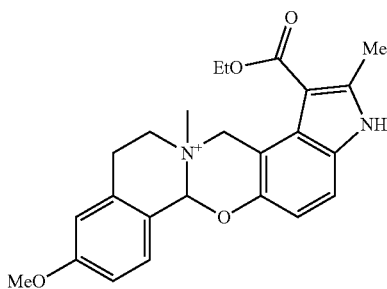 [SMILES: CCOC(=O)c1c(C)[nH]c2ccc3c(c12)C[N+]1(C)CCc2cc(OC)ccc2C1O3]

To a solution of the indolo-oxazino isoquinoline derivative 6 (580 mg, 1.48 mmol) in technical grade acetone (10 mL) was added MeI (420 μL, 7.4 mmol), and the reaction mixture was stirred at RT for 16 hours. Then the organic solvents were evaporated entirely under vacuum, and the crude material was subjected to FCC using 15% DMF and 85% CHCl$_3$ to give two diastereomers (A&B) in 2:1 ratio (260 mg for the less polar material and 409 mg for the more polar material, in 85% total yield. $^1$HNMR listed for the less polar derivative (compound A) (600 MHz, DMSOd$_6$) δ 12.16 (s, 1H), 7.64 (d, J=8.7 Hz, 1H), 7.47 (d, J=8.8 Hz, 1H), 7.13 (d, J=8.7 Hz, 1H), 7.07 (dd, J=2.5, 8.7 Hz, 1H), 6.99 (d, J=2.3 Hz, 1H), 6.51 (s, 1H), 5.28 (q, J=16.3 Hz, 1H), 4.29-4.27 (m, 2H), 4.19 (dd, J=6.0, 12.5 Hz, 1H), 4.04 (dt, J=5.2, 12.8 Hz, 1H), 3.83 (s, 1H), 3.40-3.37 (m, 1H), 3.21 (dd, J=5.3, 19.0 Hz, 1H), 2.87 (s, 3H), 2.64 (s, 3H), 1.39 (t, J=7.14 Hz, 3H); $^{13}$C NMR listed for the less polar (150 MHz, DMSOd$_6$) δ164.7, 160.1, 145.5, 145.2, 133.0, 131.5, 127.7, 123.2, 118.9, 114.1, 113.2, 112.9, 112.3, 105.7, 104.2, 89.4, 62.9, 59.6, 57.4, 55.4, 37.9, 23.0, 14.7, 14.3.

$^1$HNMR listed for the polar derivative compound B (600 MHz, DMSOd$_6$) δ 12.10 (s, 1H), 7.43 (d, J=8.8 Hz, 1H), 7.38 (d, J=8.8 Hz, 1H), 6.99-6.94 (m, 3H), 6.42 (s, 1H), 5.24 (q, J=16.9 Hz, 1H), 4.30 (m, 2H), 3.90 (m, 2H), 3.79 (s, 3H), 3.32 (m, 2H), 3.23 (s, 3H), 2.61 (s, 3H), 1.36 (t, J=7.14 Hz, 3H); $^{13}$C NMR listed for the polar derivative (150 MHz, DMSOd$_6$) δ164.7, 160.8, 145.3, 143.1, 133.0, 131.3, 129.6, 122.7, 119.4, 113.8, 113.5, 112.9, 112.2, 104.9, 104.1, 87.7, 59.6, 55.4, 51.8, 47.6, 45.7, 23.0, 14.6, 14.3.

Compound G: 2-((3-(ethoxycarbonyl)-5-methoxy-1,2-dimethyl-1H-indol-4-yl)methyl)-6-methoxy-2-methyl-1,2,3,4-tetrahydroisoquinolin-2-ium Iodide

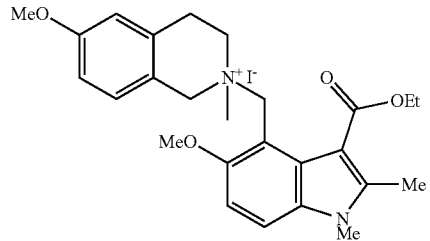 [SMILES: CCOC(=O)c1c(C)n(C)c2ccc(OC)c(C[N+]3(C)CCc4cc(OC)ccc4C3)c12 ; [I-]]

To a solution of the indole derivative 5 (394 mg, 1.0 mmol) in anhydrous DMF (5.0 mL) was added NaH (60% dispersed on oil) (120 mg, 3.0 mmol) and MeI (200 μL, 3.0 mmol). The reaction mixture was stirred at 0° C. and warmed up gradually to RT for 30 minutes, at which complete consumption of the starting material was observed based on TLC. Then the reaction mixture was treated with ice cold water and extracted with EtOAc (25 mL×4), the combined organic layer was washed with brine, dried over Na$_2$SO$_4$, filtered, and evaporated under vacuum to give crude material, which was purified using FCC and 20% MeOH/1% Et3N/DCM solution to afford 336.5 mg, 60% of the methylated indole 8. $^1$HNMR (600 MHz, Acetoned$_6$) δ 7.79 (d, J=9.0 Hz, 1H), 7.24 (d, J=9.0 Hz, 1H), 7.15 (d, J=9.3 Hz, 1H), 6.91 (m, 2H), 4.65 (ABq, J=14.9 Hz, S=0.17, 2H), 4.13 (m, 2H), 3.94 (m, 4H), 3.87 (s, 3H), 3.81 (s, 3H), 3.34 (m, 2H), 3.04 (s, 3H), 2.81 (s, 2H), 2.78 (s, 3H), 1.41 (t, J=7.14 Hz, 3H); $^{13}$C NMR (150 MHz, Acetoned$_6$) δ 167.6, 160.7, 156.9, 149.1, 134.0, 132.1, 129.6, 129.5, 120.5, 114.9, 114.7, 114.0, 108.6, 107.6, 105.5, 62.3, 61.3, 59.1, 57.2, 55.8, 30.9, 25.1, 14.8, 14.0.

Compound D: Ethyl 5-hydroxy-4-((6-methoxy-3,4-dihydroisoquinolin-2(1H)-yl)methyl)-1,2-dimethyl-1H-indole-3-carboxylate

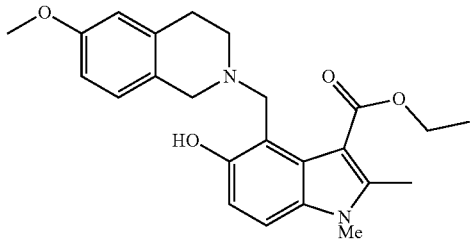 [SMILES: CCOC(=O)c1c(C)n(C)c2ccc(O)c(CN3CCc4cc(OC)ccc4C3)c12]

To a solution of the indole derivative 2 (2.1 g, 9.0 mmol) in glacial acetic acid/water solution 5:1 (11 mL) was added 6-methoxy-tetrahydroisoquinoline (1.83 g, 9.23 mmol) and formalin 37% solution (766 μL, 9.45 mmol). The reaction mixture was stirred at 90° C. for 30 minutes, at which complete consumption of the starting material was observed based on TLC. Then the reaction mixture was evaporated under vacuum to remove the acetic acid. The resulting crude material was dissolved in EtOAc (5 mL) and the organic layer was washed with saturated NaHCO$_3$ and brine. The organic layer was dried over Na$_2$SO$_4$, filtered, and evaporated, and the resulting crude was subjected to FCC using 80% EtOAc/hexanes to afford 2.2 g (63%) of the titled compound. $^1$HNMR (600 MHz, Acetoned$_6$) δ 11.34 (bs, 1H), 7.21 (d, J=8.7 Hz, 1H), 6.95 (d, J=8.9 Hz, 1H), 6.71-6.68 (m, 3H), 4.34 (s, 2H), 4.30 (q, J=7.1 Hz, 2H), 3.75 (s, 3H), 5.70 (m, 5H), 2.90-2.84 (m, 5H), 2.60 (s, 3H), 1.36 (t, J=7.14 Hz, 3H); $^{13}$C NMR (150 MHz, Acetoned$_6$) δ 167.0, 159.3, 155.2, 144.1, 135.8, 132.4, 128.4, 127.0, 126.1, 113.9, 113.4, 113.2, 112.0, 110.1, 105.6, 60.2, 58.8, 55.5, 55.4, 50.8, 15.0, 12.3.

Compound C: Ethyl 9-methoxy-2,3-dimethyl-3,6a,11,14-tetrahydro-12H-indolo[4',5':5,6][1,3]oxazino[2,3-a]isoquinoline-1-carboxylate

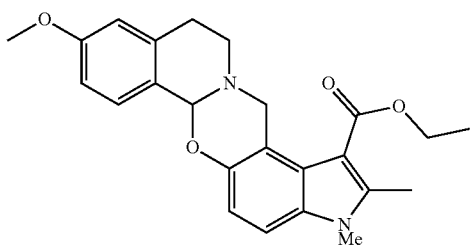 [SMILES: CCOC(=O)c1c(C)n(C)c2ccc3c(c12)CN1CCc2cc(OC)ccc2C1O3]

To a solution of compound D in absolute EtOH was added potassium acetate and iodine dissolved in 2.0 mL of EtOH. The iodine solution was added dropwise at reflux temperature. Upon completion of the addition, the reaction mixture was stirred at the same temperature for an additional 30 minutes, the reaction was quenched by treatment with saturated sodium thiosulfate solution until the disappearance of the iodine color, and then the reaction mixture was extracted with 5% MeOH/EtOAc (5 mL×4). The organic layer was washed with saturated NaHCO$_3$, brain, dried over Na$_2$SO$_4$, filtered, and evaporated. The resulting crude was subjected to FCC using 5% MEOH/EtOAc to afford the titled compound. $^1$HNMR (600 MHz, DMSOd$_6$) δ 7.31 (d, J=8.5 Hz, 1H), 7.27 (d, J=8.8 Hz, 1H), 6.82 (dd, J=2.6, 8.4, 1H), 6.75 (d, J=2.5 Hz, 1H), 6.62 (d, J=8.6 Hz, 1H), 5.68 (s, 1H), 4.40 (ABq, J=17.5 Hz, 8=0.52, 2H), 4.27 (q, J=7.1 Hz, 2H), 3.76 (s, 3H), 3.66 (s, 3H), 3.03 (m, 1H), 2.95 (m, 1H), 2.79-2.70 (m, 2H), 2.60 (s, 3H), 1.33 (t, J=7.14 Hz, 3H); $^{13}$C NMR (150 MHz, DMSOd$_6$) δ165.2, 159.1, 148.7, 143.8, 136.3, 131.2, 129.4, 126.2, 123.1, 112.8, 112.0, 109.9, 109.3, 104.1, 85.1, 59.3, 55.1, 53.4, 43.5, 29.8, 28.7, 14.4, 12.1.

Compound H & I: 1-(ethoxycarbonyl)-9-methoxy-2,3,13-trimethyl-3,6a,11,12,13,14-hexahydroindolo[4',5':5,6][1,3]oxazino[2,3-a]isoquinolin-13-ium Iodide

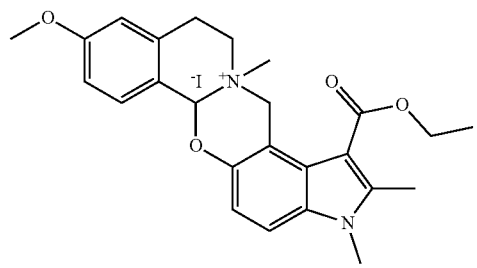

To a solution of compound C in technical grade acetone was added MeI, and the reaction mixture was stirred at RT for 16 hours. Then the organic solvents were evaporated entirely under vacuum and the crude material was subjected to FCC using 15% DMF and 85% CHCl$_3$ to give two diastereomers in 2:1 ratio. $^1$HNMR listed for the less polar derivative (compound H) (600 MHz, DMSOd$_6$) δ 7.68 (d, J=8.9 Hz, 1H), 7.64 (d, J=6.7 Hz, 1H), 7.20 (d, J=8.9 Hz, 1H), 7.07 (dd, J=2.5, 8.6 Hz, 1H), 6.98 (d, J=2.4 Hz, 1H), 6.53 (s, 1H), 5.23 (ABq, J=16.1 Hz, Δδ=0.13, 2H), 4.39-4.27 (m, 2H), 4.16 (dd, J=5.9, 12.5 Hz, 1H), 4.03 (dt, J=5.0, 12.7 Hz, 1H), 3.82 (s, 3H), 3.78 (s, 3H), 3.41-3.32 (m, 1H), 3.20 (dd, J=5.2, 18.4 Hz, 1H), 2.89 (s, 3H), 2.69 (s, 3H), 1.39 (t, J=7.14 Hz, 3H); $^{13}$C NMR listed for the less polar (150 MHz, DMSOd$_6$) δ164.7, 160.2, 146.0, 145.5, 133.1, 133.0, 127.8, 122.4, 118.9, 114.2, 113.2, 112.2, 111.9, 105.6, 104.1, 89.4, 62.8, 59.9, 57.5, 55.5, 37.9, 30.3, 23.0, 14.4, 12.4.

$^1$HNMR listed for the polar derivative (compound I) (600 MHz, DMSOd$_6$) δ 7.60 (d, J=8.9 Hz, 1H), 7.44 (d, J=8.6 Hz, 1H), 7.01 (d, J=8.9 Hz, 1H), 6.98 (d, J=2.3 Hz, 1H), 6.95 (dd, J=2.6, 8.5 Hz, 1H), 6.44 (s, 1H), 5.19 (q, J=16.8 Hz, 1H), 4.36-4.27 (m, 2H), 3.86 (t, J=6.9 Hz, 2H), 3.79 (s, 3H), 3.74 (s, 3H), 3.33 (m, 2H), 3.22 (s, 3H), 2.66 (s, 3H), 1.36 (t, J=7.14 Hz, 3H); $^{13}$C NMR listed for the polar derivative (150 MHz, DMSOd$_6$) δ164.7, 160.8, 145.8, 143.3, 133.0, 132.8, 129.7, 121.9, 119.4, 113.9, 113.6, 112.2, 111.9, 104.8, 104.0, 87.7, 59.8, 55.4, 47.6, 30.2, 23.1, 14.3, 12.3.

Compound E: ethyl 5-methoxy-4-((6-methoxy-3,4-dihydroisoquinolin-2(1H)-yl)methyl)-2-methyl-1H-indole-3-carboxylate (20180705-A688Y)

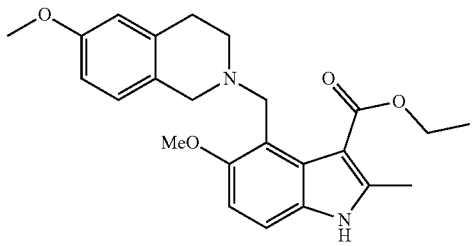 [SMILES: CCOC(=O)c1c(C)[nH]c2ccc(OC)c(CN3CCc4cc(OC)ccc4C3)c12]

To a solution of indole 1 (3.0 g, 13.76 mmol) in anhydrous DCM (100 mL) was added imidazole (2.0 g, 28.9 mmol) and TBDPS (3.7 mL, 14.45 mmol). The reaction mixture was stirred at RT for 16 hours. After the disappearance of the starting material based on the TLC, the reaction mixture was treated with 5% HCl solution. The organic phase was washed with brine, dried over $Na_2SO_4$, filtered, and evaporated under vacuum to give a gray solid, which was used directly in the next step without further purification.

To a solution of the silylated indole above (3.1 g, 6.8 mmol) in anhydrous THF (60 mL), was added di-tert-butyl dicarbonate (3.0 g, 13.6 mmol) and DMAP (85 mg, 0.68 mmol). The reaction mixture was heated to 50° C. with continuous stirring for 1 hour. Then the reaction mixture was mixed with water and extracted with EtOAc (25 mL×3). The combined organic layer was washed with brine, dried over $Na_2SO_4$, filtered, and evaporated under vacuum. After flash chromatography using EtOAc/hexane, the N-Boc protected indole was collected as a white solid (3.22 g, 85%).

To a solution of the N-Boc protected indole prepared above (3.0 g, 5.4 mmol) in anhydrous THF (15 mL) was added 1M solution of TBAF (8.1 mL, 8.1 mmol). The reaction mixture was stirred at RT for 2 hours or until the disappearance of the starting material. The reaction mixture was mixed with 5% HCl solution and the aqueous layer was extracted with EtOAc (25 mL×3), the combined organic layer was washed with brine, dried over $Na_2SO_4$, filtered, and evaporated under vacuum. The crude material was purified using flash chromatography to give a white solid (1.45 g, 84.2% yield).

To a solution of the indole derivative from the previous step (319.0 mg, 1.0 mmol) in glacial acetic acid/water solution 5:1 (1.33 mL) was added 6-methoxy-tetrahydroisoquinoline HCl salt (198 g, 1.0 mmol) and formalin 37% solution (81 µL, 1.0 mmol). The reaction mixture was stirred at 90° C. for 30 minutes, at which complete consumption of the starting material was observed based on TLC. Then the reaction mixture was evaporated under vacuum to remove the acetic acid. The resulting crude material was dissolved in EtOAc (5 mL) and the organic layer was washed with saturated $NaHCO_3$ and brine. The organic layer was dried over $Na_2SO_4$, filtered, and evaporated. The resulting crude was subjected to FCC using 80% EtOAc/hexanes to afford 316 mg (64%).

To a solution of the resulting 5-hydroxy indole derivative above (135 mg, 0.27 mmol) in anhydrous DMF (2.0 mL) was added NaH (60% dispersed in oil; 11.0 mg, 0.27 mmol) and MeI (17.5 µL, 0.27 mmol). The reaction mixture was stirred at 0° C. and warmed up gradually to RT over 1 hour, at which complete consumption of the starting material was observed based on TLC. Then the reaction mixture was treated with ice cold water and extracted with EtOAc (5 mL×4), the combined organic layer was washed with brine, dried over $Na_2SO_4$, filtered, and evaporated under vacuum to give crude material which was purified by flash chromatography using EtOAc/hexane to give (98 mg, 71% yield).

To a solution of the 5-methoxy indole derivative prepared above (80 mg, 0.16 mmol) was added 4M HCl solution in dioxane (4.0 mL), and the solution heated to 100° C. for 2 hours. After evaporation of the volatiles under vacuum, the crude material was subjected to flash chromatography purification using EtOAc/hexane to give a white solid (45 mg, 69.0%). $^1$HNMR (600 MHz, Acetone$_6$) δ7.23 (d, J=8.8 Hz, 1H), 6.93 (d, J=8.8 Hz, 1H), 6.82 (d, J=8.4 Hz, 1H), 6.61 (dd, J=2.6, 8.8 Hz, 1H), 6.57 (d, J=2.5 Hz, 1H), 4.16 (s, 2H), 4.09 (q, J=7.1 Hz, 2H), 3.83 (s, 3H), 3.70 (s, 3H), 3.39 (s, 2H), 2.82 (s, 2H), 2.63 (t, J=5.8 Hz, 2H), 2.50 (m, 5H), 1.16 (t, J=7.1 Hz, 3H); $^{13}$C NMR listed for the polar derivative (150 MHz, DMSOd$_6$) δ166.5, 158.8, 154.3, 137.0, 132.4, 129.0, 128.0, 127.6, 113.8, 112.5, 111.0, 109.8, 109.1, 60.1, 58.2, 55.7, 55.4, 52.4, 50.5, 30.7, 14.8, 13.8.

Compounds F and J

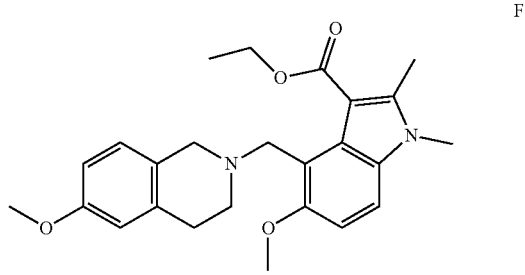

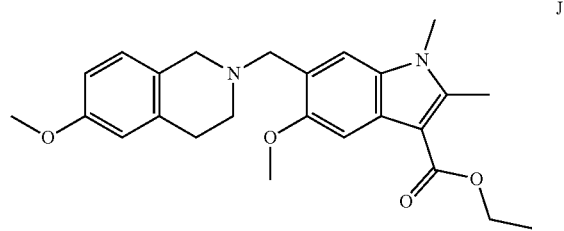

To a solution of the resulting 5-hydroxy indole derivative above (40.0 mg, 0.1 mmol) in anhydrous DMF (1.0 mL) was added NaH (60% dispersed on oil; 4.0 mg, 0.1 mmol) and MeI (14.0 µL, 0.1 mmol). The reaction mixture was stirred at 0° C. and warmed up gradually to RT over 1 hour, at which complete consumption of the starting material was observed based on TLC. Then the reaction mixture was treated with ice cold water and extracted with EtOAc (2.0 mL×4), the combined organic layer was washed with brine, dried over $Na_2SO_4$, filtered, and evaporated under vacuum to give crude material, which was purified by flash chromatography using EtOAc/hexane to give 19.0 mg (37% yield).

Compound K

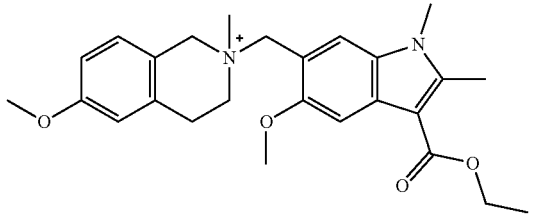 [SMILES: CCOC(=O)c1c(C)n(C)c2cc(C[N+]3(C)CCc4cc(OC)ccc4C3)c(OC)cc12]

The compound was synthesized as follows: To a solution of compound J was added NaH (60% dispersed on oil; 11.0 mg, 0.27 mmol) and MeI (17.5 μL, 0.27 mmol). The reaction mixture was stirred at 0° C. and warmed up gradually to RT over 1 hour, at which complete consumption of the starting material was observed based on TLC. Then the reaction mixture was treated with ice cold water and extracted with EtOAc, the combined organic layer was washed with brine, dried over $Na_2SO_4$, filtered, and evaporated under vacuum to give crude material, which was purified by flash chromatography using EtOAc/hexane.

Binding Assay Results

Figure 6:
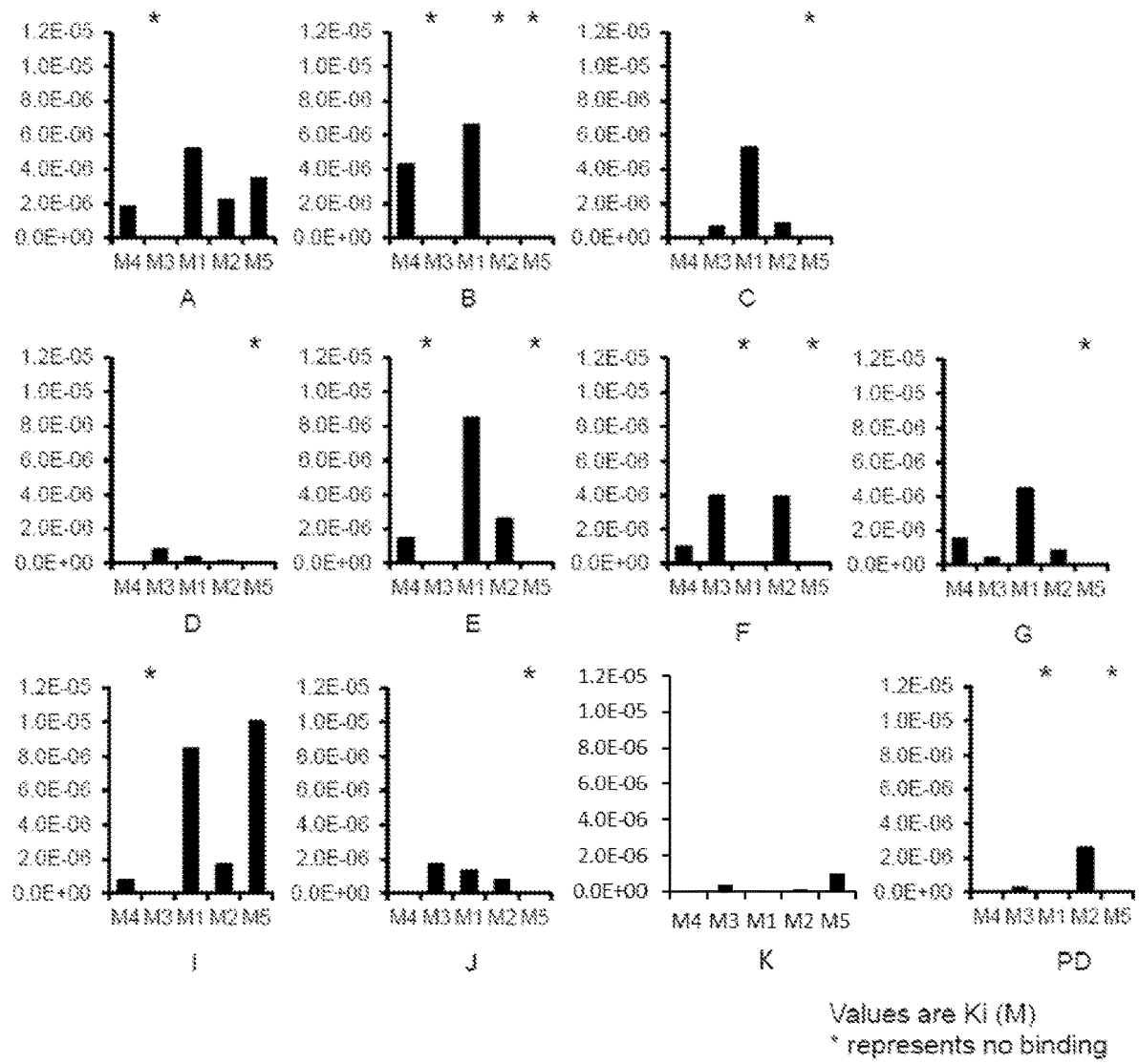
FIG. 6. Receptor binding assay results for PD102807 and Compounds A-K on receptors CHRM1-5 (M1-M5).

FIG. 6 shows receptor binding assay results for PD102807 and Compounds A-K on receptors CHRM1-5 (M1-M5). PD102807 and Compounds A-K at concentrations of $1\times10^{-9}$ M, $1\times10^{-8}$ M, $1\times10^{-7}$ M, $1\times10^{-6}$ M, and $1\times10^{-5}$ M were tested in standard binding assays with radioligands and cell membranes with receptors. Compound binding was calculated as a percent inhibition of the binding of a radioactively labeled ligand specific for each target, and the Ki values were determined. The Ki values are provided in Table 1 below. For CHRM1, the binding assay was performed using [$^3$H]pirenzepine (2 nM) as a radioligand and membranes of CHO cells with human recombinant CHRM1 receptor. The incubation time was 60 minutes at room temperature. For CHRM2, the binding assay was performed using [$^3$H]AF-DX 384 (2 nM) as a radioligand and membranes of CHO cells with human recombinant CHRM2 receptor. The incubation time was also 60 minutes at room temperature. For CHRM3, the binding assay was performed using [$^3$H]4-DAMP (0.2 nM) as a radioligand and membranes of CHO cells with human recombinant CHRM3 receptor. The incubation time was also 60 minutes at room temperature. For CHRM4, the binding assay was performed using [$^3$H]4-DAMP (0.2 nM) as a radioligand and membranes of CHO cells with human recombinant CHRM4 receptor. The incubation time was also 60 minutes at room temperature. For CHRM5, the binding assay was performed using [$^3$H]4-DAMP (0.3 nM) as a radioligand and membranes of CHO cells with human recombinant CHRM5 receptor. The incubation time was also 60 minutes at room temperature.

TABLE 1

Ki values for various compounds

| | M4 | M3 | M1 | M2 | M5 |
|---|---|---|---|---|---|
| A | 1.8E−06 | * | 5.2E−06 | 2.2E−06 | 3.5E−06 |
| B | 4.3E−06 | * | 6.6E−06 | * | * |
| C | 4.6E−09 | 6.0E−07 | 5.2E−06 | 8.5E−07 | * |
| D | 4.2E−08 | 7.4E−07 | 2.8E−07 | 5.9E−08 | * |
| E | 1.5E−06 | * | 8.5E−06 | 2.6E−06 | * |
| F | 9.5E−07 | 3.9E−06 | * | 3.9E−06 | * |
| G | 1.5E−06 | 4.0E−07 | 4.4E−06 | 7.6E−07 | * |
| I | 7.4E−07 | * | 8.5E−06 | 1.7E−06 | 1.0E−05 |
| J | 8.9E−09 | 1.7E−06 | 1.3E−06 | 7.5E−07 | * |
| K | 5.4E−08 | 4.0E−07 | 5.4E−08 | 1.0E−07 | 9.8E−07 |
| PD | 5.1E−09 | 2.1E−07 | * | 2.5E−06 | * |

Values are Ki (M)
* represents no binding

Figure 7:
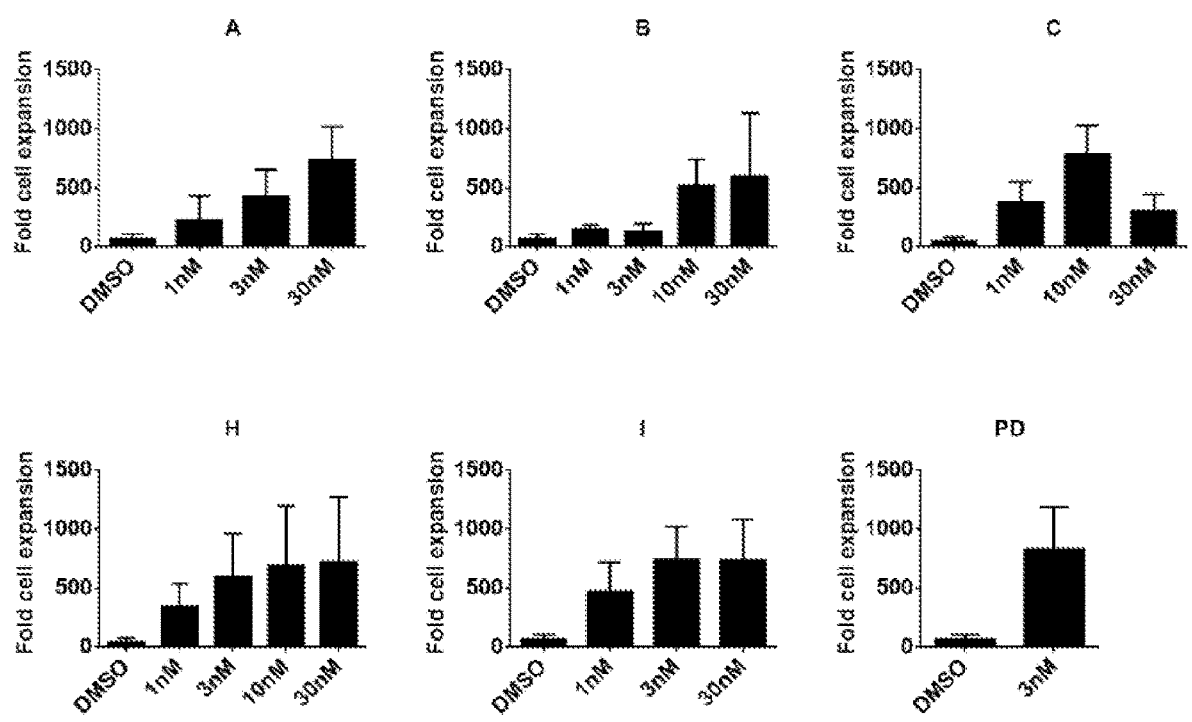
FIGS. 7 and 8. Results of the primary mouse BFU-E culture assay.
Figure 8:
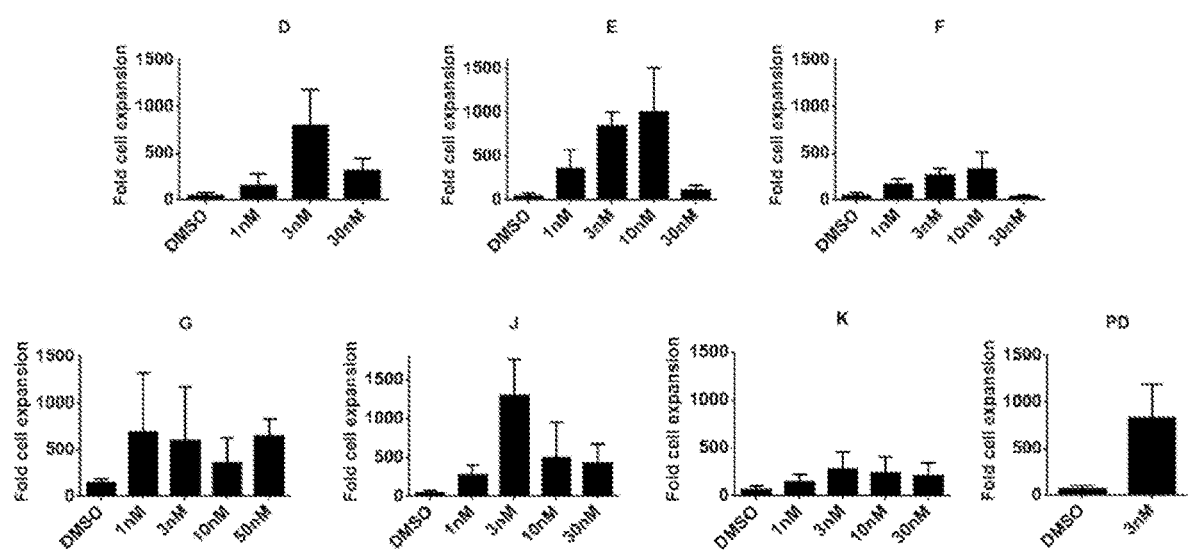

FIGS. 7 and 8 show the results of the primary BFU-E culture assay. FIG. 7 shows the results for Compounds A, B, C, H, and I, while FIG. 8 shows the results for Compounds D, E, F, G, J, and K. The data in FIGS. 7 and 8 demonstrate that PD102807 and Compounds A-K induce BFU-E expansion. Highly purified BFU-Es were isolated as lin-Ter-119-CD16/CD32-Sca-1-CD41-c-Kit+CD71/Cd24a$^{10\% \ low}$ population using the fluorescence-activated cell sorting (FACS) method. BFU-Es were cultured in medium containing rmSCF, EPO, and rmIGF-1, in the presence of PD102807 or Compounds A-K at indicated concentrations. The cell numbers in the culture system at day 9 are shown; there was a significantly higher fold cell expansion in cultures treated with compounds A-K than untreated.

Figure 9:
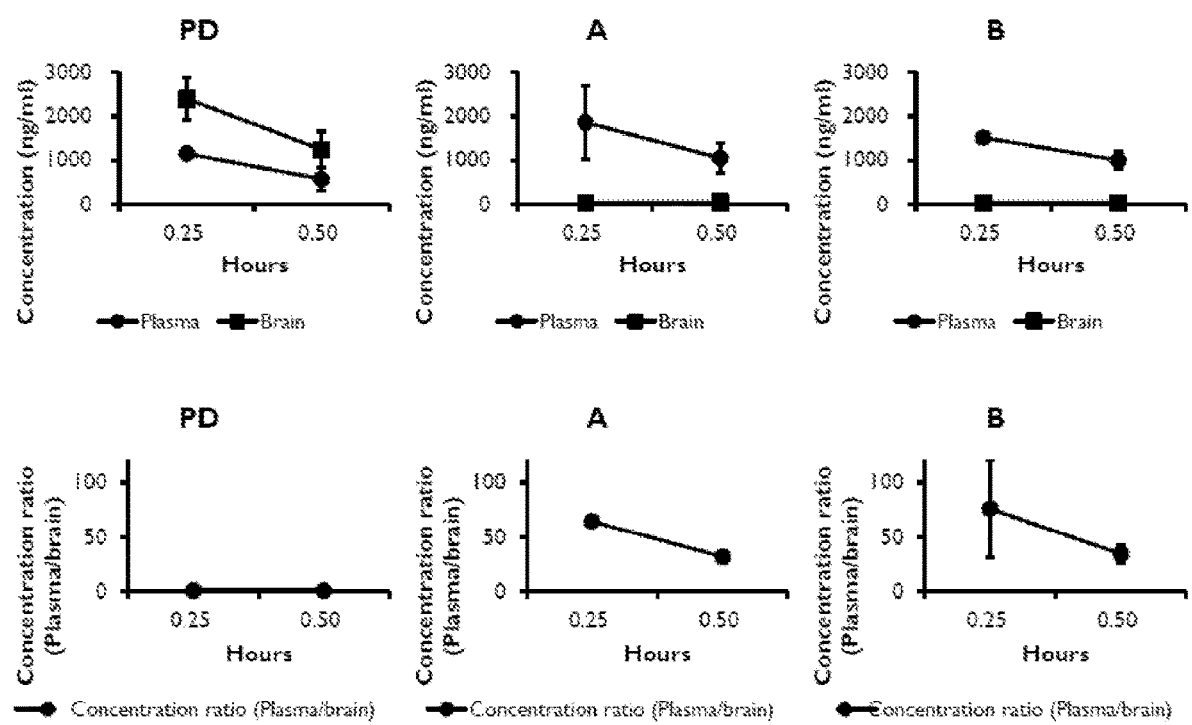
FIG. 9. Pharmacokinetic profile (plasma) and brain penetration assay of PD102807 and Compounds A and B. The concentration is shown in the top panels while the concentration ratio (plasma/brain) is shown in the bottom panels.

FIG. 9 shows the pharmacokinetic profile (plasma) and brain penetration assay of PD102807 and Compounds A and B. The concentration (top panels) and concentration ratio (plasma/brain) (bottom panels) are shown in FIG. 9. The data in FIG. 9 demonstrates that Compounds A and B exhibit reduced brain penetration in comparison to PD102807. PD102807 and Compounds A and B were intraperitoneally injected into mice. Blood was collected at each time point, and transferred tubes containing anticoagulant were centrifuged to obtain plasma. Brain samples were collected each time point and then quick frozen in liquid nitrogen and kept at −75±15° C. Brain samples were homogenized. Concentrations of PD102807 and Compound A and B in the plasma and brain samples were analyzed using the LC-MS/MS method.

Figure 10:
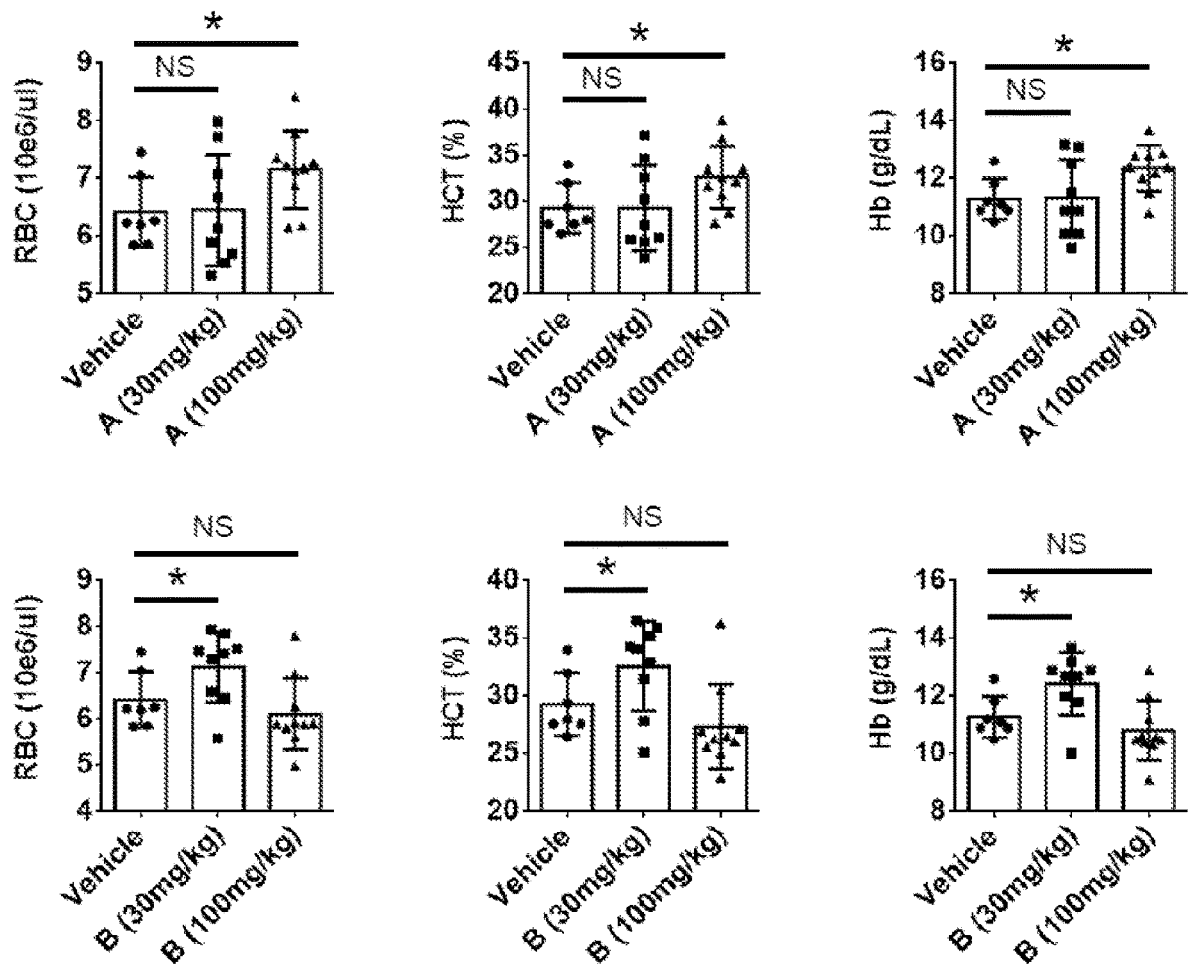
FIG. 10. Results of a compound in an in vivo anemia animal model efficacy assay for Compound A (top panel) and Compound B (bottom panel).

FIG. 10 shows the results of a compound in an in vivo anemia animal model efficacy assay and demonstrates that Compounds A and B treat anemia in vivo. C57bl/6 mice were injected with 60 mg/kg phenylhydrazine to induce hemolysis. Mice were delivered with either vehicle control or Compound A or B (30 mg/kg or 100 mg/kg). Peripheral blood samples were collected retro-orbitally using heparinized capillary tubes into blood collection tubes with K2-EDTA. Complete blood counting was performed using Hemavet 950. Hematocrit (HCT), red blood cell (RBC) and hemoglobin (Hb) values are shown.

Figure 11:
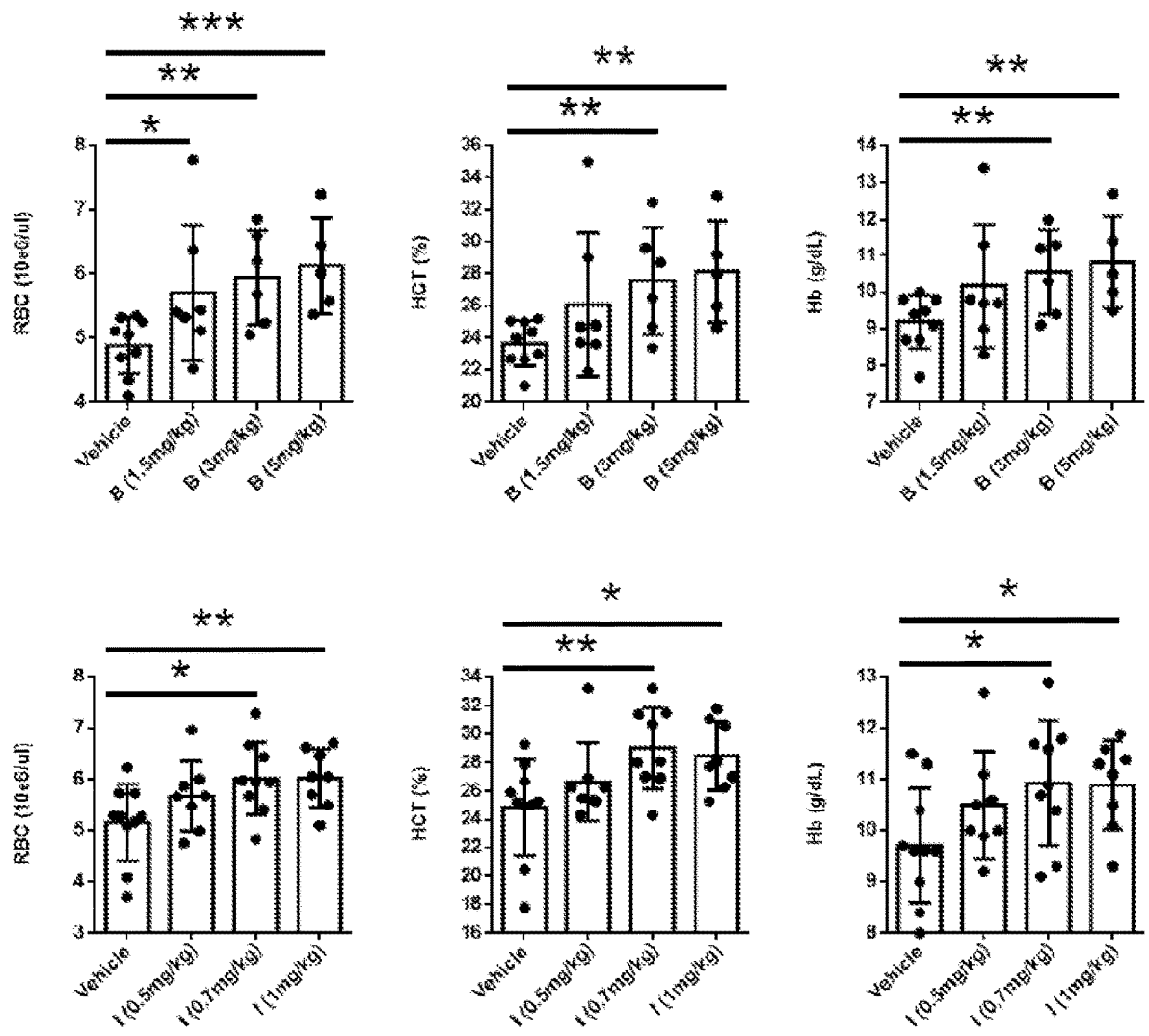
FIG. 11. Results of a compound in an in vivo anemia animal model efficacy assay for Compound B (top panel) and Compound I (bottom panel).

FIG. 11 shows the results of a compound in an in vivo anemia animal model efficacy assay and demonstrates that Compounds B and I treat anemia in vivo. C57bl/6 mice were injected with 60 mg/kg phenylhydrazine to induce hemolysis. Mice were delivered with subcutaneous injection with either vehicle control or Compound B (1.5 mg/kg, 3 mg/kg, or 5 mg/kg) or I (0.5 mg/kg, 0.7 mg/kg, or 1 mg/kg). Peripheral blood samples were collected retro-orbitally using heparinized capillary tubes into blood collection tubes with K2-EDTA. Complete blood counting was performed using Hemavet 950. Hematocrit (HCT), red blood cell (RBC) and hemoglobin (Hb) values are shown.

Figure 12:
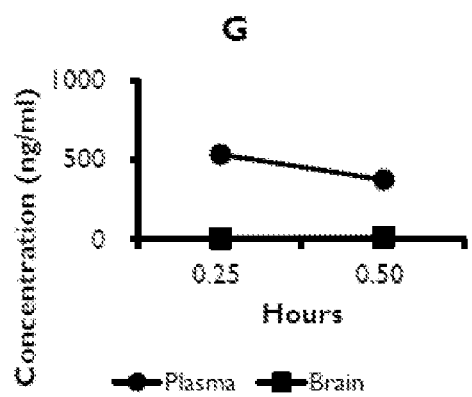
FIG. 12. Pharmacokinetic profile (plasma) and brain penetration assay of Compound G. The concentration plot is shown in the top panel while the concentration ratio (plasma/brain) plot is shown in the bottom panel.
Figure 12:
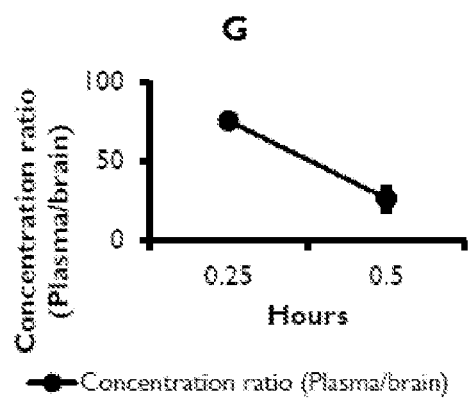

FIG. 12 shows the pharmacokinetic profile (plasma) and brain penetration assay of Compound G. The concentration (top panel) and concentration ratio (plasma/brain) (bottom panel) are shown in FIG. 12. The data in FIG. 12 demonstrates that Compound G exhibits reduced brain penetration in comparison to PD102807. Compound G was intraperitoneally injected into mice. Blood was collected at each time point, and transferred tubes containing anticoagulant were centrifuged to obtain plasma. Brain samples were collected each time point and then quick frozen in liquid nitrogen and kept at −75±15° C. Brain samples were homogenized. Concentrations of Compound G in the plasma and brain samples were analyzed using the LC-MS/MS method.

While there have been shown and described what are at present considered the preferred embodiments of the invention, those skilled in the art may make various changes and modifications which remain within the scope of the invention defined by the appended claims.

What is claimed is:

1. A compound of the formula:

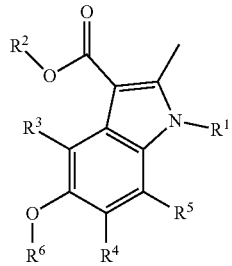

(1)

wherein:
$R^1$ is H or $CH_3$;
$R^2$ is a hydrocarbon group having 1-3 carbon atoms;
$R^3$, $R^4$, and $R^5$ are independently selected from hydrogen atom, halogen atoms, $CH_3$, $CF_3$, OH, $OCH_3$, SH, $SCH_3$, and the following structure (1-1):

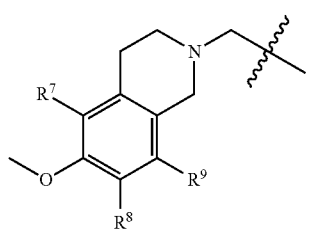

(1-1)

provided that one or two of $R^3$, $R^4$, and $R^5$ is the structure of Formula (1-1);
$R^6$ is $CH_3$;
$R^7$, $R^8$, and $R^9$ are independently selected from hydrogen atom, halogen atoms, $CH_3$, $CF_3$, OH, $OCH_3$, SH, and $SCH_3$;
and wherein the compound of Formula (1) includes pharmaceutically acceptable salts, solvates, enantiomers, and polymorphs of said compound of Formula (1).

2. The compound of claim 1, wherein the compound has the following formula:

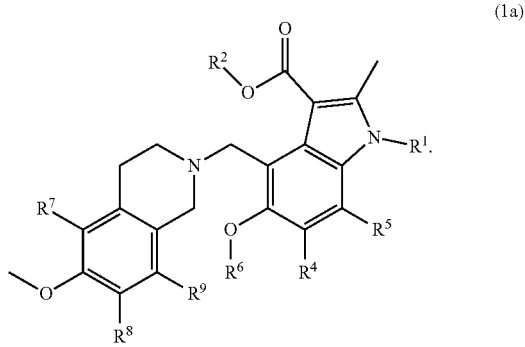

(1a)

3. The compound of claim 1, wherein the compound has the following formula:

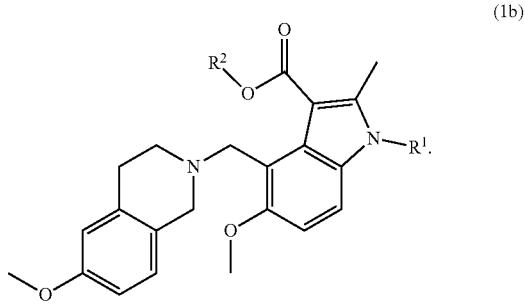

(1b)

4. The compound according to claim 1, wherein $R^1$ is a hydrogen atom.

5. The compound according to claim 1, wherein $R^1$ is methyl.

6. The compound according to claim 1, wherein $R^2$ is ethyl.

7. The compound according to claim 1, wherein $R^1$ is hydrogen atom and $R^2$ is ethyl.

8. The compound according to claim 1, wherein $R^1$ is methyl and $R^2$ is ethyl.

9. A compound of the formula:

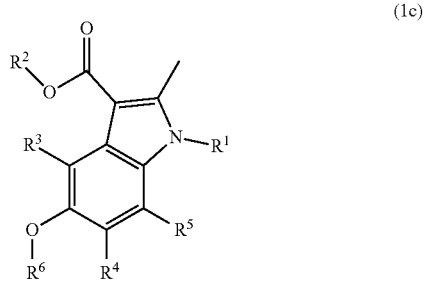

(1c)

wherein:
$R^1$ is H or $CH^3$;
$R^2$ is a hydrocarbon group having 1-3 carbon atoms;
$R^3$, $R^4$, and $R^5$ are independently selected from hydrogen atom, halogen atoms, $CH_3$, $CF_3$, OH, $OCH_3$, SH, $SCH_3$, and the following structure (1-2):

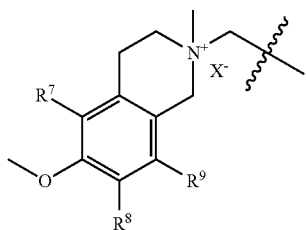

provided that one or two of $R^3$, $R^4$, and $R^5$ is the structure of Formula (1-2);
$R^6$ is H or $CH_3$;
$R^7$, $R^8$, and $R^9$ are independently selected from hydrogen atom, halogen atoms, $CH_3$, $CF_3$, OH, $OCH_3$, SH, and $SCH_3$;
$X^-$ is an anion to counterbalance the positively charged portion of the compound; and
wherein the compound of Formula (1c) includes pharmaceutically acceptable salts, solvates, enantiomers, and polymorphs of said compound of Formula (1c).

10. The compound of claim 9, wherein the compound has the following formula:

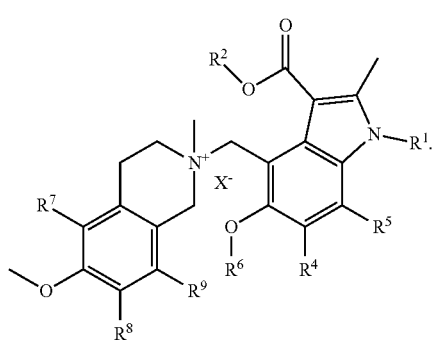

11. The compound of claim 9, wherein the compound has the following formula:

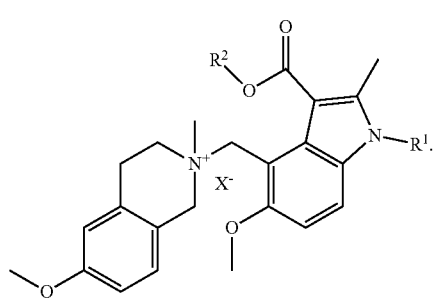

12. The compound according to claim 9, wherein $R^1$ is a hydrogen atom.
13. The compound according to claim 9, wherein $R^1$ is methyl.
14. The compound according to claim 9, wherein $R^2$ is ethyl.
15. The compound according to claim 9, wherein $R^1$ is hydrogen atom and $R^2$ is ethyl.
16. The compound according to claim 9, wherein $R^1$ is methyl and $R^2$ is ethyl.
17. A compound of the formula:

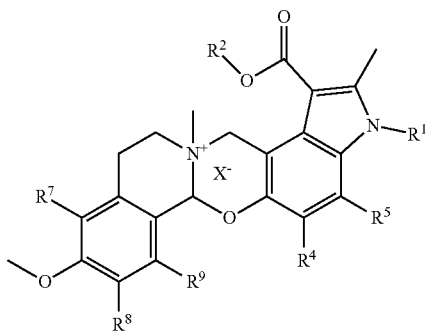

$R^1$ is H or $CH_3$;
$R^2$ is a hydrocarbon group having 1-3 carbon atoms;
$R^4$, $R^5$, $R^7$, $R^8$, and $R^9$ are independently selected from hydrogen atom, halogen atoms, $CH_3$, $CF_3$, OH, $OCH_3$, SH, and $SCH_3$; and
wherein the compound of Formula (2b) includes pharmaceutically acceptable salts, solvates, enantiomers, and polymorphs of said compound of Formula (2b).

18. The compound of claim 17, wherein $R^2$ is ethyl.
19. The compound according to claim 17, wherein the compound of Formula (2b) is a single enantiomer.
20. The compound of claim 17, wherein the compound has the following formula:

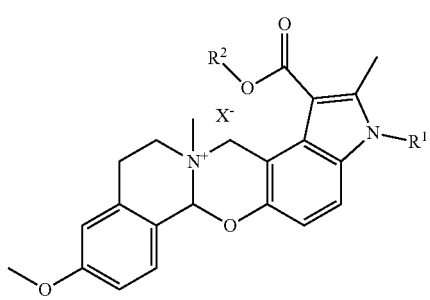

wherein $R^1$, $R^2$, and $X^-$ are as defined in claim 17.

21. A method of treating anemia in a subject in need, the method comprising administering a therapeutically effective amount of an M4-specific antagonist to said subject.
22. The method of claim 21, wherein said M4-specific antagonist is a compound having the following formula:

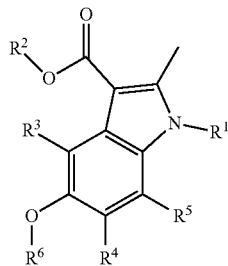

wherein:
R¹ is H or $CH_3$;
R² is a hydrocarbon group having 1-3 carbon atoms;
R³, R⁴, and R⁵ are independently selected from hydrogen atom, halogen atoms, $CH_3$, $CF_3$, OH, $OCH_3$, SH, $SCH_3$, and the following structure (1-1):

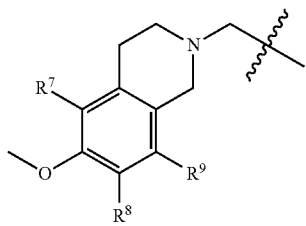

(1-1)

provided that one or two of R³, R⁴, and R⁵ is the structure of Formula (1-1);
R⁶ is H or $CH_3$;
R⁷, R⁸, and R⁹ are independently selected from hydrogen atom, halogen atoms, $CH_3$, $CF_3$, OH, $OCH_3$, SH, and $SCH_3$;
wherein the method results in increased self-renewal of BFU-E cells; and
wherein the compound of Formula (1) includes pharmaceutically acceptable salts, solvates, enantiomers, and polymorphs of said compound of Formula (1).

23. The method of claim 21, wherein said M4-specific antagonist is a compound having the following formula:

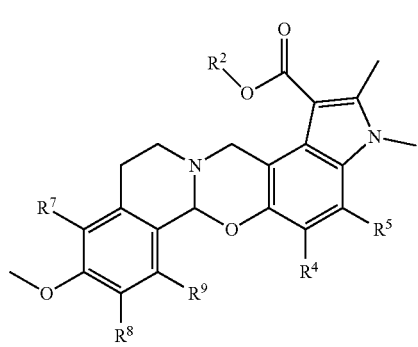

(2)

wherein:
R² is a hydrocarbon group having 1-3 carbon atoms; and
R⁴, R⁵, R⁷, R⁸, and R⁹ are independently selected from hydrogen atom, halogen atoms, $CH_3$, $CF_3$, OH, $OCH_3$, SH, and $SCH_3$;
wherein the method results in increased self-renewal of BFU-E cells; and
wherein the compound of Formula (2) includes pharmaceutically acceptable salts, solvates, enantiomers, and polymorphs of said compound of Formula (2).

24. The method of claim 21, wherein said M4-specific antagonist is a compound having the following formula:

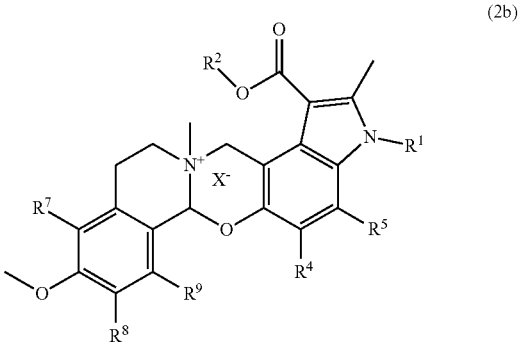

(2b)

R¹ is H or $CH_3$;
R² is a hydrocarbon group having 1-3 carbon atoms;
R⁴, R⁵, R⁷, R⁸, and R⁹ are independently selected from hydrogen atom, halogen atoms, $CH_3$, $CF_3$, OH, $OCH_3$, SH, and $SCH_3$;
wherein the method results in increased self-renewal of BFU-E cells; and
wherein the compound of Formula (2b) includes pharmaceutically acceptable salts, solvates, enantiomers, and polymorphs of said compound of Formula (2b).

* * * * *